US012583425B2

(12) United States Patent
van Thiel

(10) Patent No.: US 12,583,425 B2
(45) Date of Patent: Mar. 24, 2026

(54) BRAKE SYSTEM WITH SAFER EMERGENCY STOP FUNCTION AND METHOD FOR SAME

(71) Applicant: ZF CV Systems Europe BV, Brussels (BE)

(72) Inventor: Julian van Thiel, Grossburgwedel (DE)

(73) Assignee: ZF CV Systems Europe BV, Brussels (BE)

( * ) Notice: Subject to any disclaimer, the term of this patent is extended or adjusted under 35 U.S.C. 154(b) by 981 days.

(21) Appl. No.: 17/743,242

(22) Filed: May 12, 2022

(65) Prior Publication Data

US 2022/0266807 A1 Aug. 25, 2022

Related U.S. Application Data

(63) Continuation of application No. PCT/EP2020/080637, filed on Nov. 2, 2020.

(30) Foreign Application Priority Data

Nov. 18, 2019 (DE) ..................... 10 2019 131 110.1

(51) Int. Cl.
*B60T 13/38* (2006.01)
*B60T 13/68* (2006.01)

(52) U.S. Cl.
CPC .......... *B60T 13/385* (2013.01); *B60T 13/683* (2013.01); *B60T 2270/402* (2013.01); *B60T 2270/413* (2013.01)

(58) Field of Classification Search
CPC ............. B60T 13/683; B60T 2270/402; B60T 2270/413; B60T 8/885; B60T 13/385
See application file for complete search history.

(56) References Cited

U.S. PATENT DOCUMENTS 8,651,588 B2 * 2/2014 Bensch ................... B60T 8/327
303/7
2009/0184568 A1 * 7/2009 Bensch ................. B60T 13/683
303/115.2
(Continued)

FOREIGN PATENT DOCUMENTS

CN 109677382 A 4/2019
DE 10336611 A1 * 3/2005 ............ B60T 13/263
(Continued)

OTHER PUBLICATIONS

Translation of the Written Opinion of the International Searching Authority dated Feb. 26, 2021 for international application PCT/EP2020/080637 on which this application is based.
(Continued)

*Primary Examiner* — Robert A. Siconolfi
*Assistant Examiner* — Mahbubur Rashid
(74) *Attorney, Agent, or Firm* — Walter Ottesen, P.A.

(57) ABSTRACT

The disclosure is directed to a method for safe emergency stopping of a utility vehicle having an electronically controllable pneumatic brake system with spring brake cylinders on at least one axle. The electronically controllable pneumatic brake system has a service brake system and a first redundancy system. In the event of a first fault in the service brake system, the vehicle is braked by the redundancy system. The electronically controllable brake system furthermore has an unthrottled ventilation path, and a ventilation path, for the ventilation of the spring brake cylinders. The method includes determining a second fault in the redundancy system, and, in response, automatically throttling ventilation of at least one of the spring brake cylinders via the throttled ventilation path to effect slow, safe stopping of the vehicle.

30 Claims, 10 Drawing Sheets

(56) References Cited

U.S. PATENT DOCUMENTS

| | | | |
|---|---|---|---|
| 2010/0072810 A1 | 3/2010 | Bensch et al. | |
| 2010/0237690 A1 | 9/2010 | Foerster et al. | |
| 2017/0267221 A1 | 9/2017 | Hecker et al. | |
| 2019/0152459 A1 | 5/2019 | Dieckmann et al. | |
| 2019/0193705 A1 | 6/2019 | Wulf | |
| 2019/0248346 A1 | 8/2019 | Wulf | |
| 2019/0248350 A1 | 8/2019 | Wulf | |
| 2019/0248351 A1 | 8/2019 | Wulf | |
| 2020/0023820 A1 | 1/2020 | Van Thiel | |
| 2020/0023827 A1 | 1/2020 | Van Thiel | |
| 2020/0070795 A1 | 3/2020 | Van Thiel | |
| 2020/0148180 A1 | 5/2020 | Van Thiel | |

FOREIGN PATENT DOCUMENTS

| | | | |
|---|---|---|---|
| DE | 10 2005 060 225 A1 | 6/2007 | |
| DE | 10 2007 047 691 A1 | 4/2009 | |
| DE | 10 2014 006 013 A1 | 10/2015 | |
| DE | 10 2014 013 756 B3 | 2/2016 | |
| DE | 10 2016 005 318 A1 | 11/2017 | |
| DE | 10 2016 010 461 A1 | 3/2018 | |
| DE | 10 2016 010 462 A1 | 3/2018 | |
| DE | 10 2016 010 463 A1 | 3/2018 | |
| DE | 10 2016 010 464 A1 | 3/2018 | |
| DE | 10 2017 002 716 A1 | 9/2018 | |
| DE | 10 2017 002 719 A1 | 9/2018 | |
| DE | 10 2017 002 721 A1 | 9/2018 | |
| DE | 102017002718 A1 * | 9/2018 | ............. B60T 13/66 |
| DE | 102019106274 A1 * | 9/2020 | ............ B60T 13/662 |
| WO | WO-2007073791 A1 * | 7/2007 | ............ B60T 13/683 |
| WO | 2008/025400 A1 | 3/2008 | |
| WO | WO-2020038798 A1 * | 2/2020 | ............ B60T 13/268 |

OTHER PUBLICATIONS

International Search Report of the European Patent Office dated Feb. 26, 2021 for international application PCT/EP2020/080637 on which this application is based.

* cited by examiner

BRAKE SYSTEM WITH SAFER EMERGENCY STOP FUNCTION AND METHOD FOR SAME

CROSS REFERENCE TO RELATED APPLICATIONS

This application is a continuation application of international patent application PCT/EP2020/080637, filed Nov. 2, 2020 designating the United States and claiming priority from German application 10 2019 131 110.1, filed Nov. 18, 2019, and the entire content of both applications is incorporated herein by reference.

TECHNICAL FIELD

The disclosure relates to a method for safe emergency stopping of a vehicle, in particular a utility vehicle, having an electronically controllable pneumatic brake system with spring brake cylinders on at least one axle, wherein the electronically controllable pneumatic brake system has a service brake system and at least one first redundancy system, wherein, in the event of a first fault in the service brake system, the vehicle is braked by the redundancy system.

BACKGROUND

The disclosure furthermore relates to an electropneumatic holding brake unit, preferably electropneumatic holding brake module, for use in a method of the type mentioned above for the automated throttled ventilation of at least one spring brake cylinder in a fault situation, having a supply port for receiving supply pressure, a spring-type accumulator port for the connection of at least one spring brake cylinder, a pilot control unit for providing a first control pressure, which pilot control unit has a pilot control ventilation path, which is connected to the supply port and receives supply pressure, and a pilot control ventilation path, which is connected to a ventilation port, and a main valve unit which receives the first control pressure and which is configured to provide a spring brake pressure at the spring-type accumulator port in a manner dependent on the received first control pressure. The disclosure furthermore relates to a vehicle, in particular utility vehicle.

In modern electronically controllable pneumatic brake systems, which are used in particular in utility vehicles that are intended for autonomous driving, it is important to provide measures that allow safe deceleration of the utility vehicle even in the event of a fault in the brake system. Approaches here include using fully redundant brake systems, partially redundant brake systems or only different levels in one brake system, such that, in the event of a fault in a first level, the brake system can continue to be operated, at least with restrictions, in a second level.

However, if a double fault occurs, for example, which affects both the primary brake system and the redundant brake system, there is a risk that the utility vehicle can no longer be braked in a controlled manner. In such situations, there is a need to provide a system that allows safe deceleration of the vehicle.

A system that is aimed in particular at achieving high residual availability is known, for example, from US 2017/0267221 which is incorporated herein by reference. The document discloses electrical equipment of a vehicle with an at least partially electric braking and steering device, which includes: an electric or electromechanical steering device, which is connected to a steering gear and which includes an electronic steering control device and an electric steering actuator, and a service brake device. As a service brake device, US 2017/0267221 proposes an electropneumatic service brake device which includes an electropneumatic service brake valve device, an electronic brake control device, electropneumatic modulators and pneumatic wheel brake actuators, wherein the electronic brake control device electrically controls the electropneumatic modulators in order to generate pneumatic brake pressures or brake control pressures for the pneumatic wheel brake actuators on a wheel-specific, axle-specific or side-specific basis. The electropneumatic service brake valve device has a service brake actuation element and also, within an electrical service brake circuit, an electrical channel with an electrical brake signal transmitter that can be actuated by the service brake actuation element. Furthermore, an electronic evaluation device is provided which receives the actuation signals and, in a manner dependent on the actuation signals, inputs braking demand signals into the electronic brake control device and, within at least one pneumatic service brake circuit, includes at least one pneumatic channel, in which actuation of the service brake actuation element owing to a driver braking demand causes at least one control piston of the service brake valve device to be loaded with a first actuating force and, in response to this, the control piston makes it possible to generate pneumatic brake pressures or brake control pressures for the pneumatic wheel brake actuators. The electronic evaluation device of the electropneumatic service brake valve device furthermore includes electronic control means for generating, independently of a driver braking demand, a second actuating force which, in the presence of a braking demand that is independent of the driver demand, acts on the control piston in the same direction as or in the opposite direction to the first actuating force. The electropneumatic service brake device is supplied by an electrical energy source which is independent of a second electrical energy source which supplies the electropneumatic service brake valve device with electrical energy. It is hereby ensured that, as far as possible, always at least one of the two systems is functional. The electric or electropneumatic steering device is supplied with energy from the second electrical energy source. It is sought in this way to achieve high residual availability. However, the system is complex and thus cannot be readily implemented in every utility vehicle.

A system that provides electronically pneumatically controlled redundancy is disclosed in US 2019/0152459 which is incorporated herein by reference. The system disclosed in the document uses a bypass valve in order, depending on the failure of a subsystem, to transmit control pressures in order to provide an at least pneumatic supply to the circuit in which an electrical failure has respectively occurred. This, too, increases the residual availability. Similar systems are disclosed in US 2019/0193705 and in US 2019/0248351 which are both incorporated herein by reference.

Furthermore, US 2019/0248350, which is incorporated herein by reference, discloses a system and method in which pilot control valves are electronically controlled by way of a redundancy signal if a failure or a defect is detected in the electronic control of wheel brakes of the brake system. Here, the system seeks to prevent the wheels from locking.

US 2020/0023820, US 2020/0023827, US 2020/0070795 and US 2020/0148180, which are all incorporated herein by reference, have disclosed systems in which a redundancy is generated pneumatically in each case. Here, different output brake pressures, for example front axle, rear axle or trailer brake pressures, are used in order to be provided as redundancy pressure to failed systems, such as the front axle brake circuit, rear axle brake circuit, parking brake circuit or trailer brake circuit. In this way, a subordinate pneumatic redundancy level is generated, such that high residual availability is likewise achieved.

Furthermore, systems also exist which incorporate the trailer, as disclosed for example in US 2019/0248346 which is incorporated herein by reference.

SUMMARY

An object of the disclosure is to provide a system which allows safe stopping of the vehicle even when redundant systems, subsystems or levels of the brake system have failed. For example, if a brake system is supplied from several power sources, in the worst case all of the power sources may fail. In this case, too, it is sought to ensure in a simple manner that the vehicle can be safely decelerated.

This object can, for example, be achieved via a method of the type mentioned in the introduction, and in the case of a brake system which furthermore has an unthrottled ventilation path, and a ventilation path that is throttled relative thereto, for the ventilation of the spring brake cylinders, in that the method has the steps: ascertainment of a second fault in the redundancy system, and, in response to the ascertainment of the second fault: automated throttled ventilation of at least one of the spring brake cylinders via the throttled ventilation path for the purposes of slow, safe stopping of the vehicle. While it is thus provided according to the disclosure that, if a first fault occurs that affects the service brake system, the redundancy system performs the control of the vehicle, it is provided that, even in the event of failure of the redundancy system, that is, if the second fault occurs, the vehicle is stopped by virtue of at least one, preferably all, spring brake cylinders being ventilated in throttled fashion.

The unthrottled ventilation path preferably has a first cross section with a maximum volume flow A, and the throttled path has a second cross section with a maximum volume flow B, which is smaller than the first volume flow A by a factor C. The factor C is dependent on the configuration of the brake system and also of the vehicle, but is preferably in a range from 100 to 10,000. The nominal width of the unthrottled ventilation path is preferably approximately 10 to 100 times the nominal width of the throttled ventilation path.

The throttled and the unthrottled ventilation path may be accommodated at any location in the electronically controllable pneumatic brake system, as long as at least one of the spring brake cylinders can be ventilated via these. The service brake system and the redundancy system may, in part, include common components, such as valves and brake actuators in particular. For example, it is conceivable that the service brake system and the redundancy system differ only in terms of separate electronic control units, which may at least partially replace one another. The service brake system and the redundant brake system are preferably each supplied with energy by way of a dedicated power supply.

In a preferred embodiment, the automated throttled ventilation includes a deenergization of at least one monostable valve. If a monostable valve is deenergized, it returns to the stable state. In this way, a monostable valve can be particularly easily coupled to a control unit, and in the event of a fault in the control unit or a power failure, the monostable valve no longer receives a signal and is thus deenergized and returns to the stable state. This return to the stable state can be used indirectly or directly for the throttled ventilation of the at least one spring brake cylinder. Safety can also be improved in this way. The switching of the monostable valve into the stable state does not require the active provision of a signal by a control unit, but occurs solely owing to the loss of voltage across the monostable valve.

It is furthermore preferred that the service brake system of the electronically controllable pneumatic brake system is controlled via a central module and the redundancy system of the electronically controllable pneumatic brake system is controlled via a holding brake unit that is pneumatically connected to the spring brake cylinders. In this embodiment, both the central module and the holding brake unit preferably have electronic control units that are configured to receive signals via a vehicle bus or in some other way with a brake signal transmitter, for example a manually actuatable brake signal transmitter and/or an autonomous driving unit, and to then distribute the signals in the brake system such that corresponding brake actuators at wheels of the vehicle are actuated. In this embodiment, the electronic control unit of the holding brake unit may at least partially replace the electronic control unit of the central module. If the central module fails owing to a fault, the holding brake unit performs the control of the electronically controllable pneumatic brake system. If the holding brake unit also fails, the at least one spring brake cylinder is ventilated in automated throttled fashion. It is particularly preferable for the redundancy system to be formed by the holding brake unit, since this is configured and provided for aerating and ventilating spring brake cylinders even during the normal operation of the brake system, such that the holding brake unit can be particularly easily configured such that, in the event of a double fault, the at least one spring brake cylinder is ventilated in automated throttled fashion, preferably via the holding brake unit. The holding brake unit preferably has a holding brake module or is configured as such.

It is preferably also provided that, in an operating situation in which no fault is present, the holding brake unit pressurizes the spring brake cylinders for the purposes of releasing the latter; in a first redundancy situation, if a first fault is present in the service brake system, the holding brake unit performs the control of the electronically controllable pneumatic brake system; and in a multiple fault situation, if a first fault is present in the service brake system and a second fault is present in the first redundancy system, the spring brake cylinders are ventilated in automated throttled fashion. The spring brake cylinders are preferably ventilated via the holding brake module or a further unit or a holding brake unit that the holding brake module may include.

If the electronically controllable pneumatic brake system has a second redundancy system which intervenes when the first redundancy system has a fault, it is preferably provided that the automated throttled ventilation of the spring brake cylinders is performed only if the second redundancy system also has a fault. In this case, the automated throttled ventilation takes effect only as a third fallback level, namely if the service brake system fails, the first redundancy system fails and the second redundancy system fails. It is preferably only then that the spring brake cylinders are ventilated in automated throttled fashion.

In a preferred embodiment, it is provided that, if initially the second fault in the first redundancy system occurs, and as a result the holding brake unit deenergizes one or more monostable valves such that the spring brake cylinders are ventilated, a further unit, preferably the central module, initiates an aeration of the spring brake cylinders. The further unit may be any other unit of the electronically controllable pneumatic brake system. The central module is particularly suitable for the described situation, because in the described situation no fault has occurred, but initially the second fault occurs and the first fault has not yet occurred. The central module may thus be configured to pressurize the spring brake cylinders for as long as the first fault has not occurred, irrespective of whether a second fault has occurred and irrespective of whether the holding brake unit is caused to ventilate the spring brake cylinders. It can be ensured in this way that, while the service brake system is controlling the vehicle and a fault occurs in the redundancy system, the vehicle is not automatically stopped but can continue to be operated.

The spring brake cylinders are preferably pressurized via the further unit via a release port on the holding brake unit. This release port may for example be configured as an anti-compounding port. For this purpose, the further unit, in particular the central module, may have one or more switchable valves which, for as long as the service brake system is operating correctly, are energized and as a result output a pressure that is then provided directly or indirectly to the spring brake cylinders in order to pressurize these.

The method furthermore preferably has the step: setting a degree of throttling of the throttled ventilation path while the electronically controllable pneumatic brake system is controlled by the service brake system. The degree of throttling may preferably be implemented in a manner dependent on data provided via a vehicle bus and/or from the electronically controllable pneumatic brake system, and/or in a manner dependent on a vehicle type, a loading condition, an axle load, a vehicle mass or a brake distribution. The degree of throttling should be set such that the vehicle is braked rapidly but safely. For example, less throttling can be provided if the vehicle is relatively highly loaded than if the loading condition of the vehicle is relatively low. In this case, too low a degree of throttling would result in a tendency for the wheels of the vehicle to lock. The same applies to axle load, vehicle mass, brake distribution and vehicle type. Other data that can be provided via the vehicle bus are for example directly actuating signals for the setting of the degree of throttling, but also data relating to a roadway, data from a navigation system from which, for example, a possible braking distance can be derived, data from vehicles traveling in front or behind, or data from other systems that indicate a potential failure of the system. The degree of throttling may be implemented in particular by reducing or increasing the nominal width or the cross section of the throttled ventilation path.

In a second aspect of the disclosure, the object mentioned in the introduction is achieved, in the case of an electropneumatic holding brake unit of the type mentioned in the introduction in that a monostable throttle arrangement is provided, which when energized is held in a first switching position, which allows unthrottled ventilation of the spring-type accumulator port via an unthrottled ventilation path, and when deenergized assumes a second switching position, which allows throttled ventilation of the spring-type accumulator port via a throttled ventilation path. The monostable throttle arrangement consequently switches back and forth between the unthrottled and the throttled ventilation path and connects the spring-type accumulator port to either the unthrottled ventilation path or the throttled ventilation path in a manner dependent on the state of the electronically controllable pneumatic brake system.

It should be understood that the method according to the first aspect of the disclosure and the electropneumatic holding brake unit according to the second aspect of the disclosure have the same and similar sub-aspects. In this respect, reference is also made to the above description in its entirety, in particular for further features and the advantages thereof.

The throttle arrangement is preferably arranged in the pilot control ventilation path. The pilot control ventilation path of the pilot control unit of the electropneumatic holding brake unit serves to ventilate the spring-type accumulator port of the electropneumatic holding brake unit. It is therefore preferable for the throttle arrangement to also be accommodated in this path. However, it may be provided that the throttle arrangement is controlled not by an electronic control unit of the electropneumatic holding brake unit but by another, superordinate unit. The pilot control unit of the electropneumatic holding brake unit may be of monostable or bistable configuration.

In an embodiment, the throttle arrangement has a first monostable throttle valve which is open in the first switching position of the throttle arrangement and which is open with a throttling action in the second switching position of the throttle arrangement. In this way, the first monostable throttle valve, in the first switching position, allows the spring-type accumulator port to be pressurized and ventilated without further restrictions, in particular in unthrottled fashion. Only when the first monostable throttle valve assumes the second switching position, in particular because it is deenergized, in particular owing to a second fault in the redundancy system, is it open only in throttled fashion, such that the ventilation of the spring-type accumulator port is throttled. This is a particularly simple way of implementing the concept of the disclosure and, in a fault situation, in particular double fault situation, of ventilating the spring-type accumulator port, and thus the spring brake cylinder(s) connected thereto, in throttled fashion.

It is furthermore preferred that the first monostable throttle valve is configured as a 2/2 directional throttle valve or as a 3/2 directional throttle valve. In the case of a 3/2 directional throttle valve, for example, the two connections that can be alternately connected to the third connection may lead to two different lines, of which one line has a throttle and the other line is unthrottled. In the case of a 2/2 directional throttle valve, it may be provided that the throttle valve intrinsically has a throttle, which in the second switching position is connected between the two ports of the 2/2 directional throttle valve.

The throttle arrangement particularly preferably has an adjustable throttle that can be adjusted via an electronic throttle signal. For example, a servomotor is provided here, which can vary a cross section of the throttled ventilation line in order to thus set a degree of throttling. The throttle signal is preferably provided by a superordinate unit, in particular a central module of the electronically controllable brake system, preferably a central module that also controls a service brake system. Other possibilities for configuring a throttle to be adjustable are also encompassed and preferred.

In an embodiment, the electropneumatic holding brake unit has a release port for the input of a release pressure, wherein the release port is connected to the main valve unit of the electropneumatic holding brake unit, and wherein the main valve unit is configured to provide a spring brake pressure at the spring-type accumulator port in a manner dependent on the received release pressure. In this way, the main valve unit of the electropneumatic holding brake unit thus receives both a control pressure from the pilot control unit and the release pressure as control pressure in order to output the spring brake pressure either based on the release pressure or based on the control pressure output by the pilot control unit. In the event that the pilot control unit of the electropneumatic holding brake unit is non-functional or is not functioning correctly, for example because a second fault has occurred in the redundancy system, the release pressure can be provided in this way, and the main valve unit can process this release pressure in order to thus output the spring brake pressure in order to release the spring brake cylinders.

A shuttle valve is preferably arranged between the release port and the main valve unit. The shuttle valve then serves to form an interface to the pilot control unit also. The first shuttle valve preferably receives the release pressure and a further pressure, such as the supply pressure or the first control pressure of the pilot control unit, and outputs the higher of the release pressure and the further pressure to the main valve unit. The first shuttle valve may be connected upstream or downstream of the pilot control unit. If it receives the first control pressure, it is connected downstream of the pilot control unit. This avoids overmodulation at the main valve unit.

It is furthermore preferred that the electropneumatic holding brake unit has an electronic control unit for providing switching signals at least for the pilot control unit and the throttle arrangement. In this embodiment, the throttle arrangement is consequently controlled by the electronic control unit of the electropneumatic holding brake unit such that the throttle arrangement is deenergized and returns to the stable state if the electronic control unit of the electropneumatic holding brake unit fails. The electropneumatic holding brake unit is preferably also provided to control the redundancy system such that, in the event of the second fault, the electronic control unit of the electropneumatic holding brake unit fails and the throttle arrangement is deenergized.

In a further preferred embodiment, the electropneumatic holding brake unit includes an electronically switchable release valve for electronically outputting an electronically output release pressure at the main valve unit, wherein the release valve is controlled by an external electronic control unit that is independent of the electronic control unit. The external electronic control unit is external to the electropneumatic holding brake unit and may for example be an electronic control unit of a central module, of an axle modulator, of a superordinate control module, of an autonomous driving unit or the like. It is also conceivable and preferred that the external electronic control unit is provided precisely for this purpose. The external electronic control unit may be arranged on the electropneumatic holding brake unit, in preferred cases even within a module into which the electropneumatic holding brake unit is integrated, but is supplied independently of the electronic control unit, in particular from an independent energy source. The release valve serves to provide the electronically output release pressure at the main valve unit. The electronically output release pressure may have the same function as the above-described release pressure, and serves to output the spring brake pressure. In this respect, the main valve unit is configured to output the spring brake pressure in a manner dependent on the receipt of the electronically output release pressure. In this way, it is possible and preferred that the release pressure does not have to be provided by another unit. Rather, the release pressure can be provided directly by the electronically switchable release valve as an electronically output release pressure. For this purpose, the electronically switchable release valve is preferably connected to one or more supply pressure vessels. Furthermore, the release valve may be connected upstream or downstream of the release port. In this way, it is also possible for the release valve to be used to block the release port of the electropneumatic holding brake unit.

In a further preferred embodiment, the first monostable throttle valve and the release valve are integrated in a combination valve. The combination valve is preferably configured as a 3/2 directional valve. In this way, the combination valve can, for example in a first switching position, allow unthrottled ventilation, but at the same time also unthrottled aeration, and allow throttled ventilation in the second switching position. In this way, one valve can be saved overall, as a result of which installation space and costs can be reduced.

According to an embodiment, the throttle arrangement has a second monostable throttle valve which interacts with the first monostable throttle valve for the purposes of automatic throttled ventilation of the spring-type accumulator port. Here, a throttled ventilation of the spring-type accumulator port via the throttle arrangement is preferably possible only when the first and the second monostable throttle valve are deenergized. A redundancy can be introduced in this way. The spring-type accumulator port is ventilated only when both throttle valves are deenergized. A single fault at a throttle valve thus does not lead directly to ventilation of the spring-type accumulator port, such that the stability and safety of the vehicle can be improved here.

In a preferred embodiment, the second monostable throttle valve is also controlled by the electronic control unit of the electropneumatic holding brake unit. In this way, single faults in one of the throttle valves can effectively remain without consequences for the vehicle.

The pilot control unit, the main valve unit and the electronic control unit are particularly preferably jointly integrated into a holding brake module. In this way, assembly and installation space advantages can be achieved.

In a third aspect, the object mentioned in the introduction is achieved in the case of an electronically controllable pneumatic brake system of the type mentioned in the introduction having spring brake cylinders on at least one axle of a vehicle, in particular a utility vehicle, wherein the electronically controllable pneumatic brake system has a service brake system and at least one first redundancy system, and wherein, in the event of a first fault in the service brake system, the vehicle is braked by the redundancy system, in that an electropneumatic holding brake unit according to one of the above-described preferred embodiments of an electropneumatic holding brake unit according to the second aspect of the disclosure is provided. The electropneumatic holding brake unit is preferably arranged in the brake system such that the electronic control unit of the electropneumatic holding brake unit forms the control unit of the redundancy system, which performs the control of the brake system in the event that the service brake system fails.

Provision is preferably furthermore made for the release port of the electropneumatic holding brake unit to be connected to a front axle brake circuit and/or a rear axle brake circuit of the brake system. In this way, it is sought to achieve that, in the event that the front axle and/or rear axle brake circuit is functioning correctly, a release pressure is provided in order to pressurize the spring-type accumulator port. Only if the front axle brake circuit and/or rear axle brake circuit fails, and accordingly no release pressure is provided, are the spring brake cylinders ventilated and thus applied.

In a fourth aspect of the disclosure, the object mentioned in the introduction is achieved by a vehicle, in particular a utility vehicle, with an electronically controllable pneumatic brake system according to the third aspect of the disclosure.

BRIEF DESCRIPTION OF THE DRAWINGS

The invention will now be described with reference to the drawings wherein.

DESCRIPTION OF THE PREFERRED EMBODIMENTS

Figure 1:
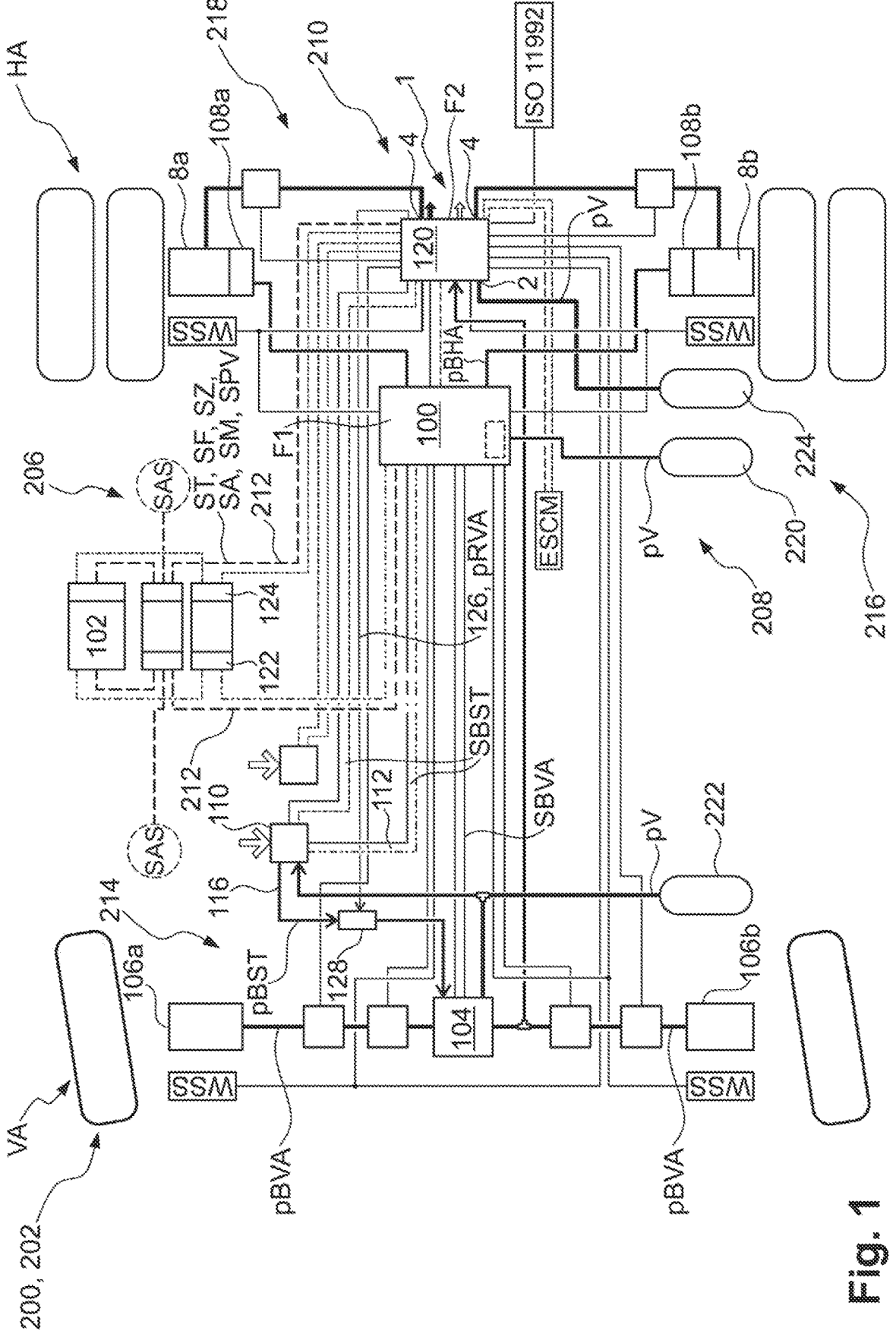
FIG. 1 shows a schematic layout of an electronically controllable pneumatic brake system.

Firstly, the function of an electronically controllable pneumatic brake system 206 according to one aspect of the disclosure will be described with reference to FIG. 1, in which a vehicle 200, in particular utility vehicle 202, is schematically shown, and then reference will be made to FIGS. 2 to 10 to describe individual embodiments of an electropneumatic holding brake unit 1, which is preferably used in the electronically controllable pneumatic brake system 206 according to FIG. 1, but is not limited thereto.

The electronically controllable pneumatic brake system 206 has a service brake system 208 and a redundancy system 210. The service brake system 208 serves to control the electronically controllable pneumatic brake system 206 during normal operation of the vehicle 200 when no fault F1, F2 has yet occurred. The redundancy system 210 performs the control of the electronically controllable pneumatic brake system 206 in the event that a first fault F1 occurs in the service brake system 208.

In detail, the electronically controllable pneumatic brake system 206 has a front axle brake circuit 214 for a front axle VA and a rear axle brake circuit 216 for a rear axle HA. Furthermore, the electronically controllable pneumatic brake system 206 has a parking brake circuit 218, which is also provided to supply a trailer (not shown here). The rear axle brake circuit 216 is supplied by a first compressed air supply 220, the front axle brake circuit 214 by a second compressed air supply 222 and the parking brake circuit 218 by a third compressed air supply 224. All three compressed air supplies 220, 222, 224 provide a supply pressure pV. When the vehicle 200 is in operation, the entire electronically controllable pneumatic brake system 206 is controlled by a central module 100. For this purpose, the central module 100 is connected via a vehicle bus 212 to an autonomous driving unit 102 in order to receive braking demand signals XBR therefrom. In order to control the front axle brake circuit 214, the central module 100 is connected to a front axle modulator 104, which in turn receives supply pressure pV from the second compressed air supply 222. The front axle modulator 104 is not illustrated in any more detail here, but includes one or more electromagnetically switchable valves and preferably a relay valve. The front axle modulator receives front axle brake signals SBVA from the central module 100 and converts these into a front axle brake pressure pBVA, which is provided via ABS valves, which are not described in detail, to front axle brake actuators 106*a*, 106*b* for the purposes of braking the front axle VA. In the embodiment shown in FIG. 1, the central module 100 is furthermore at the same time configured as a combined module and also performs the function of a rear axle modulator, which is not shown separately here. For this purpose, the central module 100 likewise has one or more electronically switchable valves and preferably a relay valve, and furthermore receives the supply pressure pV from the first compressed air supply 220. The central module 100 then switches its own valves directly and outputs a rear axle brake pressure pBHA to rear axle brake actuators 108*a*, 108*b* in a wheel-specific manner. However, it should be understood that the electronically controllable pneumatic brake system 206 according to the disclosure described herein may also include brake systems which include a separate rear axle modulator which is arranged in particular separately from the central module. In such cases, the rear axle modulator would be connected to the central module 100 at least via electrical lines, preferably via a bus line.

The electronically controllable pneumatic brake system 206 can however be controlled not only by way of the autonomous driving unit 102 but also by way of a brake signal transmitter 110. The brake signal transmitter 110 is connected via a first electrical brake signal transmitter line 112 to the central module 100 and provides a brake signal transmitter signal SBST thereto. The brake signal transmitter 110 is connected via a second electrical brake signal transmitter line 114 to an electropneumatic holding brake module 120, which will be described in more detail below. The brake signal transmitter 110 provides the brake signal transmitter signal SBST to this also. Furthermore, the brake signal transmitter 110 is pneumatically connected to the front axle VA via a pneumatic brake signal transmitter line 116. Via the pneumatic brake signal transmitter line 116, the brake signal transmitter 110 outputs a pneumatic brake signal transmitter pressure pBST to the front axle modulator 104 in order to pneumatically control the latter and thus cause the front axle brake pressure pBVA to be pneumatically output.

In the event that a fault occurs in the service brake system 208, in particular the central module 100 or a first energy supply 122 assigned thereto, the redundancy system 210 is configured to perform the control of the electronically controllable pneumatic brake system 206. Here, the redundancy system 210 is controlled primarily by the electropneumatic holding brake module 120. The holding brake module 120 is supplied by a second energy source 124 that is independent of the first energy source 122. The holding brake module 120 is furthermore also connected to the autonomous driving unit 102 via the vehicle bus 212, and likewise receives the electronic braking demand signal XBR. The holding brake module 120 has within it an electronic control unit ECU and several valves, which will be described in more detail further below. For redundant braking of the vehicle 200, the holding brake module 120 actuates the front axle VA, on the one hand, pneumatically by way of a pneumatic redundancy line 126 and a front axle redundancy pressure pRVA. The front axle redundancy pressure pRVA is provided via a front axle shuttle valve 128 to the front axle modulator 104, which receives the pressure and, in response to this, outputs the front axle brake pressure pBVA.

During redundancy operation, that is, when the holding brake module 120 is operating in the redundancy system 210, the rear axle HA is braked by the holding brake module 120 not by way of the rear axle brake actuators 108a, 108b but by way of spring brake cylinders 8a, 8b. The holding brake module 120 is not only configured to brake the vehicle 200 during redundancy operation but also functions as a holding brake module 120 for the parking of the vehicle 200. For this purpose, the holding brake module 120 is connected to the third compressed air supply 224 and receives supply pressure pV therefrom. During normal operation of the vehicle 200, the holding brake module 120 pressurizes the spring brake cylinders 8a, 8b such that they are released. By contrast, during redundancy operation, the spring brake cylinders 8a, 8b are each partially or fully ventilated in order to brake the rear axle HA.

In the case of electronically controllable pneumatic brake systems 206 that operate in this way, that is, in which, during redundancy operation, a module which is assigned to a parking brake circuit 218, such as the holding brake module 120, actuates spring brake cylinders 8a, 8b in order to brake the vehicle, there is the problem that, if this module fails or has a fault or is non-functional or is not functioning correctly, the spring brake cylinders 8a, 8b are either immediately pressurized or immediately ventilated, which in both cases can lead to severe problems.

The disclosure addresses this, and firstly proposes an electropneumatic holding brake unit 1, which may be provided as or in the holding brake module 120 in order to control or assist the redundancy system 210 in this way.

Figure 2:
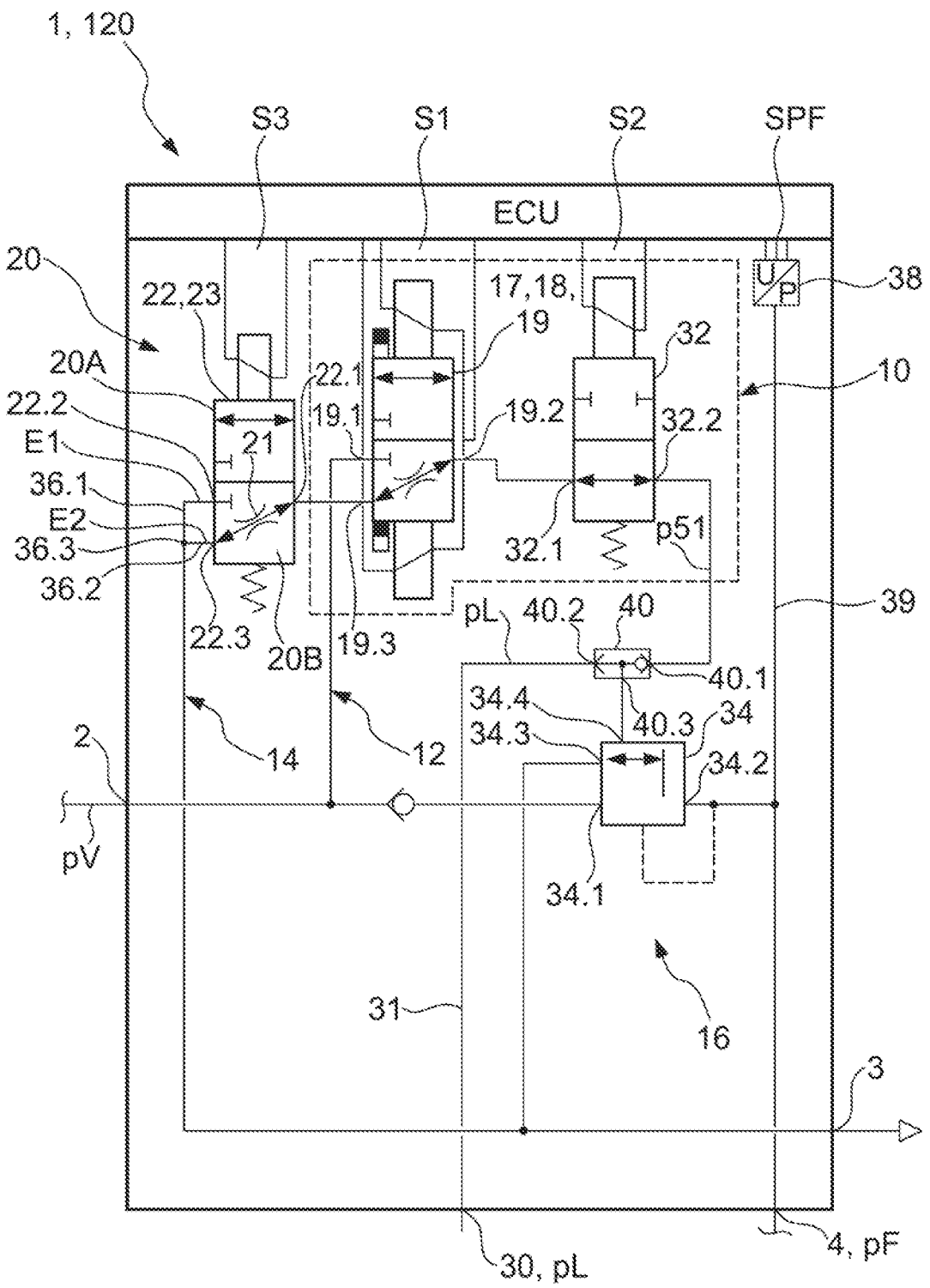
FIG. 2 shows a first embodiment of an electropneumatic holding brake unit.

Such an electropneumatic holding brake unit 1 is shown in a first embodiment in FIG. 2. The holding brake unit 1 has a supply port 2 at which it receives supply pressure pV. In the installation situation shown in FIG. 1, this supply port 2 is connected to the third compressed air supply 224. Furthermore, the holding brake unit 1 has a spring-type accumulator port 4, which may be connected to one or more spring brake cylinders 8a, 8b and at which the holding brake unit 1 outputs a spring brake pressure pF. The holding brake unit 1 has within it a pilot control unit 10, which is connected via a pilot control ventilation path 12 to the supply port 2 and via a pilot control ventilation path 14 to a vent 3. The pilot control unit 10 serves to provide a first control pressure pS1 to a main valve unit 16. The main valve unit 16 is in turn connected to the supply port 2 and thus likewise receives supply pressure pV. The main valve unit 16 is configured to output the spring brake pressure pF at the spring-type accumulator port 4 in a manner dependent on the received first control pressure pS1. This means that, during normal operation of the vehicle 200, the spring brake pressure pF should be output and substantially correspond to the supply pressure pV in order to thus pressurize, and thereby release, the spring brake cylinders 8a, 8b connected to the spring-type accumulator port 4. In a redundancy situation, when the holding brake module 120, which may include or be configured as the holding brake unit 1, performs the control of the vehicle 200, the spring brake pressure pF must be partially reduced in order to thus selectively ventilate the spring brake cylinders 8a, 8b in order to brake the vehicle 200.

Thus, if the pilot control unit 10 provides the first control pressure pS1, specifically at the full level, the spring-type accumulator port 4 is also pressurized to the full level. By contrast, if no first control pressure pS1 is provided by the pilot control unit 10, but rather the pilot control unit 10 is connected to the pilot control ventilation path 14 and the first control pressure pS1 is thus ventilated, then no spring brake pressure pF is output either. The spring-type accumulator port 4 is then at approximately the same pressure as the environment.

For the event that a second fault F2 occurs and the pilot control unit 10 cannot be controlled or cannot be controlled correctly, the holding brake unit 1 has an unthrottled ventilation path E1 and a throttled ventilation path E2. For switching between the unthrottled ventilation path E1 and the throttled ventilation path E2, a throttle arrangement 20 is provided which, specifically in the embodiment according to FIG. 2, has a first monostable throttle valve 22, which in this case is configured as a 3/2 directional throttle valve 23 and which will be described in more detail further below.

Firstly, the pilot control unit 10 will be described in detail. The pilot control unit 10 has an inlet-outlet valve 17, which is configured here as an inlet-outlet 3/2 directional valve 18, and specifically as a bistable valve 19 in the embodiment shown in FIG. 2. The bistable valve 19 has a first bistable valve port 19.1, which is connected to the supply port 2 and which receives supply pressure pV. A second bistable valve port 19.2 is connected to a pressure-maintaining valve 32 of the pilot control unit 10, and a third bistable valve port 19.3 is connected to the pilot control ventilation path 14. The bistable valve 19 is stable in both switching positions and can be controlled on the basis of a first switching signal S1, which is provided by an electronic control unit ECU of the holding brake valve unit 1. For this purpose, the electronic control unit ECU may, as shown in FIG. 1, be connected to the central module 100, to the vehicle bus 212 and/or to the autonomous driving unit 102. The bistable valve 19 has a first switching position shown in FIG. 2, in which the third bistable valve port 19.3 is connected to the second bistable valve port 19.2, such that the second bistable valve port 19.2 is connected to the pilot control ventilation path 14 and is consequently ventilated. In the second switching position (not shown in FIG. 2), the bistable valve 19 connects the first bistable valve port 19.1 to the second bistable valve port 19.2, such that the supply pressure pV is output at the second bistable valve port 19.2. The second bistable valve port 19.2 is thus connected to the pilot control ventilation path 12.

The pressure-maintaining valve 32 is configured as a monostable 2/2 directional valve and has a first pressure-maintaining valve port 32.1, which is connected to the second bistable valve port 19.2, and a second pressure-maintaining valve port 32.2, which is connected to the main valve unit 16. The monostable pressure-maintaining valve 32 is stable in a first switching position shown in FIG. 2, in which the first and second pressure-maintaining valve ports 32.1, 32.2 are connected to one another. In a second, energized switching position (not shown in FIG. 2), the pressure-maintaining valve 32 is closed and can thus confine the output pressure. The pressure-maintaining valve 32 can be switched by way of a second switching signal S2, which is likewise provided by the electronic control unit ECU of the electropneumatic holding brake valve unit 1.

If the bistable valve 19 and the pressure-maintaining valve 32 are controlled such that a pressure is output, this pressure is provided as first control pressure pS1 to the main valve unit 16. Specifically, in the embodiment shown in FIG. 2, the first control pressure pS1 is initially provided at a first shuttle valve 40, which has a first shuttle valve port 40.1 connected to the second pressure-maintaining valve port 32.2, a second shuttle valve port 40.2 connected to a release port 30 described in more detail further below, and a third shuttle valve port 40.3 at which the respectively higher of the pressures present at the first and second shuttle valve ports 40.1, 40.2 is output. The first shuttle valve 40 is thus preferably configured as a so-called select-high valve.

In the specific embodiment shown in FIG. 2, the main valve unit 16 includes a relay valve 34. The relay valve 34 has a relay valve supply port 34.1, which is connected to the supply port 2 and receives supply pressure pV. The relay valve furthermore has a relay valve working port 34.2, which is connected to the spring-type accumulator port 4 and which outputs the spring brake pressure pF at the latter. The relay valve 34 furthermore has a relay valve ventilation port 34.3, which is connected to the vent 3, and a relay valve control port 34.4, which is connected to the pilot control unit 10 and receives the first control pressure pS1, that is, in the specific embodiment according to FIG. 2 is connected to the first shuttle valve 40, more specifically to the third shuttle valve port 40.3. It should be understood that the first shuttle valve 40 is merely optional here, and there are other ways of implementing a similar circuit. In particular, it is also conceivable and preferred that the relay valve control port 34.4 is connected directly to the second pressure-maintaining valve port 32.2 or even directly to the second bistable valve port 19.2. In this respect, the pressure-maintaining valve 32 is also merely optional.

In conventional holding brake valve units that do not have a monostable throttle arrangement 20, the third bistable valve port 19.3 is connected directly to the vent 3. As a result, if a double fault occurs and also the electronic control unit ECU of the holding brake valve unit 1 is non-functional or not functioning correctly and the first and second switching signals S1, S2 are not provided or are not provided correctly, the pressure-maintaining valve 32 returns to the stable switching position shown in FIG. 2, and the bistable valve 19 remains in the switching position in which it is situated at the time of the second fault F2. If the bistable valve 19 is then situated in the second switching position (not shown in FIG. 2), the spring brake pressure pF continues to be output at the spring-type accumulator port 4, and the spring brake cylinders 8a, 8b are correspondingly pressurized and released. There are alternative switching operations in which, when the vehicle 200 is started, the bistable valve 19 is firstly brought into the second switching position (not shown in FIG. 2) in order to thus pressurize the spring-type accumulator port 4. Once this has taken place, the pressure-maintaining valve 32 is switched into the second switching position (not shown in FIG. 2), such that the first and second pressure-maintaining valve ports 32.1, 32.2 are separated, and as a result the first control pressure pS1 is confined. The bistable valve 19 can then be switched back into the first switching position shown in FIG. 2, that is, into the ventilation position. If the electronic control unit ECU now fails, the pressure-maintaining valve 32 is also deenergized and returns to the first stable switching position, such that the main valve unit 16 is consequently connected to the pilot control ventilation path 14 and ventilated. As a result, the spring brake cylinders 8a, 8b engage. This may sometimes result in very abrupt braking of the vehicle 200, which may be associated with locking of one or more wheels of the vehicle 200, which in turn can consequently lead to driving instabilities.

To avoid this, according to the disclosure described herein, the monostable throttle arrangement 20 is provided, preferably in the pilot control ventilation path 14. With reference to FIG. 2, the monostable throttle arrangement 20 includes, as already mentioned above, a first monostable throttle valve 22 which is configured as a 3/2 directional throttle valve 23. The first monostable throttle valve 22 has a first throttle valve port 22.1 which is connected to the third bistable valve port 19.3, that is, to that port of the bistable valve 19 which is connected to the pilot control ventilation path 14. Furthermore, the first monostable throttle valve 22 has a second throttle valve port 22.2 and a third throttle valve port 22.3. The second throttle valve port 22.2 connects the first throttle valve port 22.1 to the unthrottled ventilation path E1, and the third throttle valve port 22.3 connects the first throttle valve port 22.1 to the throttled ventilation path E2. In a first, stable switching position of the first monostable throttle valve 22, the first throttle valve port 22.1 is connected to the third throttle valve port 22.3, such that, in the stable switching position of the first throttle valve 22, the third bistable valve port 19.3 is connected to the throttled ventilation path E2. In a second switching position (not shown in FIG. 2) of the first throttle valve 22, the first throttle valve port 22.1 is connected to the second throttle valve port 22.2, such that the third bistable valve port 19.3 is connected to the unthrottled ventilation path E1. The first monostable throttle valve 22 can be switched from the first switching position (shown in FIG. 2) to the second switching position (not shown in FIG. 2) on the basis of a third switching signal S3 which is provided by the electronic control unit ECU. During normal driving operation, the third switching signal S3 is preferably provided permanently, such that the first monostable throttle valve 22 is always in the second switching position (not shown in FIG. 2) in which the bistable valve 19 is connected to the unthrottled ventilation path E1. It is only if, owing to a second fault F2, the electronic control unit ECU is non-functional or is not functioning correctly that the third switching signal S3 is no longer provided, such that the first monostable throttle valve 22 returns to the first stable switching position (shown in FIG. 2), in which the bistable valve 19 is connected to the throttled ventilation path E2.

As a result, in a fault situation in which the electronic control unit ECU of the holding brake valve unit 1 is non-functional or is not functioning correctly, be it owing to a fault in the electronic control unit ECU itself or owing to a fault in the energy supply, the spring-type accumulator port 4 is ventilated in throttled fashion if the bistable valve 19 is switched to the corresponding first switching position shown in FIG. 1. The throttled ventilation of the spring-type accumulator port 4 allows a throttled engagement of the spring brake cylinders 8a, 8b, such that the vehicle 200 can be stopped in controlled fashion.

The throttled ventilation path E2 preferably has a cross section that is reduced in relation to the unthrottled ventilation path E1, for example by a factor of 100 to 10,000. The nominal width of the unthrottled ventilation path E1 is preferably approximately 10 to 100 times the nominal width of the throttled ventilation path E2.

For this purpose, in the embodiment shown in FIG. 2, a first throttle 21 is formed within the first monostable throttle valve 22, such that the first monostable throttle valve 22 has the first throttle 21 within it.

As can also be seen from FIG. 2, the holding brake valve unit 1 also includes a release port 30, which has already been briefly mentioned above. The release port 30 is in this case connected directly to the second shuttle valve port 40.2. A release pressure pL can be output at the release port 30. If the release pressure pL is higher than the first control pressure pS1, the release pressure pL is provided by the first shuttle valve 40 at the relay valve control port 34.4, such that the spring brake pressure pF can in turn consequently be output. The release port 30 is provided for the situation that the electronic control unit ECU of the holding brake valve unit 1 is non-functional or is not functioning correctly, but the spring brake cylinders 8a, 8b are nevertheless to be pressurized. This may be the case for example if the second fault F2, which affects the redundancy system 210, occurs before the first fault F1. The release pressure pL can thus preferably be provided by the service brake system 208 in order to prevent the spring brake cylinders 8a, 8b from being ventilated in throttled fashion in the event that an isolated second fault F2 occurs in the electronic control unit ECU of the holding brake valve unit 1.

The configuration of the first monostable throttle valve 23 as a 3/2 directional valve means that a Y or T junction is provided in the pilot control ventilation path 14. The second throttle valve port 22.2 is thus connected to a first line piece 36.1, and the third throttle valve port 22.3 to a second line piece 36.2. The first line piece 36.1 is assigned to the unthrottled ventilation path E1, whereas the second line piece 36.2 is assigned to the throttled ventilation path E2. The two line pieces 36.1 and 36.2 are then connected to one another at a connection point 36.3 and ultimately open into the same ventilation port 3.

FIG. 2 furthermore shows a pressure sensor 38 which provides a spring-type accumulator pressure signal SPF to the electronic control unit ECU. For this purpose, the pressure sensor 38 is connected via a pressure measurement line 39 to the spring-type accumulator port 4 or the relay valve working port 34.2 in order to thus detect the spring brake pressure pF.

Figure 3:
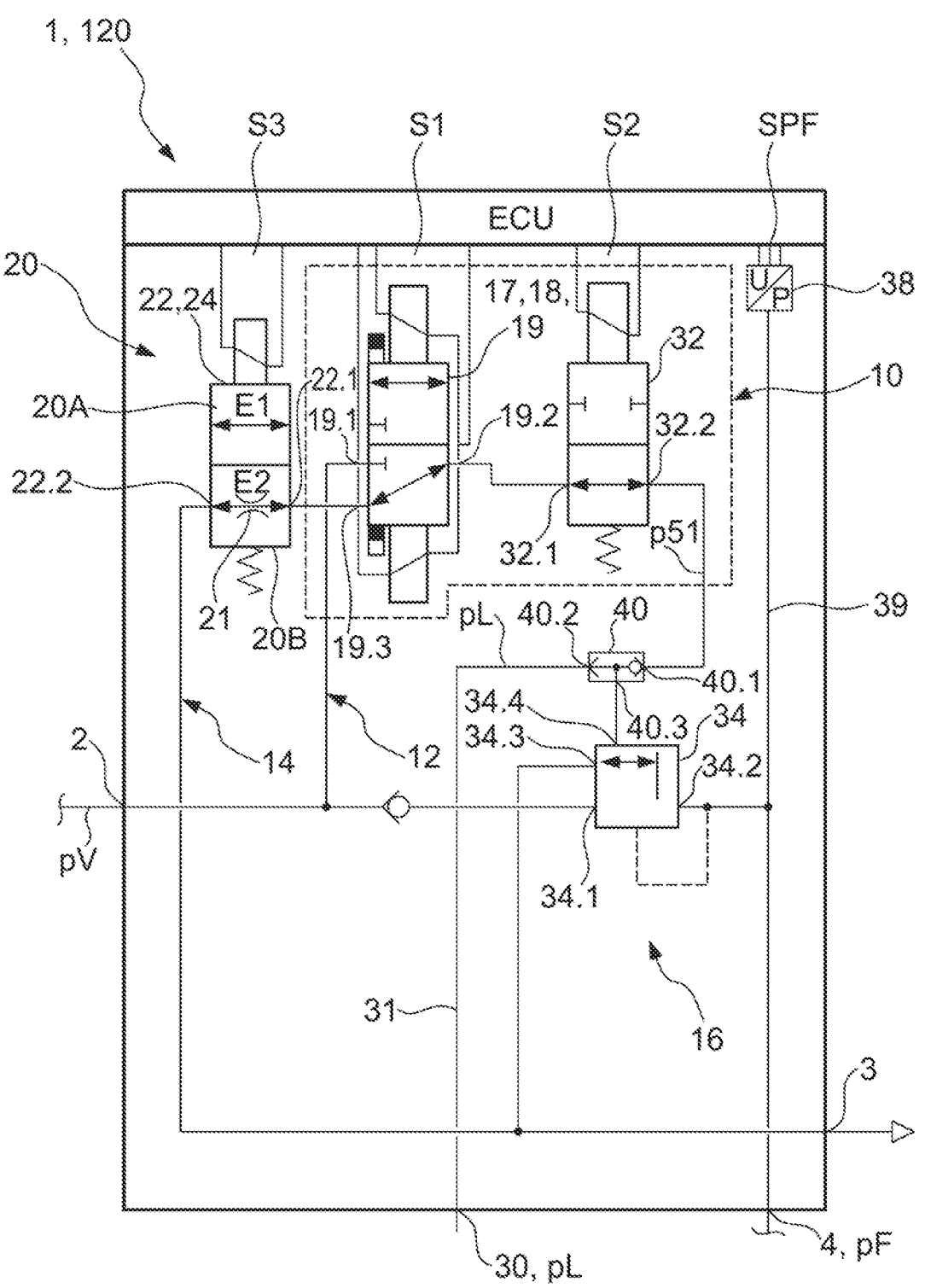
FIG. 3 shows a second embodiment of an electropneumatic holding brake unit.

FIG. 3 now shows a second embodiment of the electropneumatic holding brake unit 1. Identical and similar elements are denoted by the same reference designations, and in this respect reference is made to the above description in its entirety. In particular, the differences in relation to the first embodiment (FIG. 2) will be highlighted below.

The major difference between the first embodiment (FIG. 2) and the second embodiment (FIG. 3) is that the first monostable throttle valve 22 is configured not as a 3/2 directional throttle valve 23 but as a 2/2 directional throttle valve 24. Accordingly, it has only a first throttle valve port 22.1 and a second throttle valve port 22.2. The first throttle valve port 22.1 is connected to the third bistable valve port 19.3, as was also the case in the first embodiment (FIG. 2). Here, the second throttle valve port 22.2 is again connected to the vent 3. Since the first monostable throttle valve 22 is configured as a 2/2 directional throttle valve 24, the first and second line pieces 36.1, 36.2 can also be omitted. Rather, the pneumatic line of the pilot control ventilation path 14 is connected directly to the second throttle valve port 22.2, which then runs to the ventilation port 3. The throttle 21 is again accommodated within the first monostable throttle valve 22, specifically such that the first and second throttle valve ports 22.1, 22.2 are, in the first monostable switching position 20B, connected via the throttle 21 and, in the second, non-stable switching position 20A, connected not via a throttle but via a normal cross section. Again, the 2/2 directional throttle valve 24 can, by way of the third switching signal S3, be brought from the first switching position 20A (shown in FIG. 3) into the second switching position 20A (not shown in FIG. 3), wherein the valve, when deenergized, returns to the first switching position 20B (shown in FIG. 3) in order to thus effect throttled ventilation.

Figure 4:
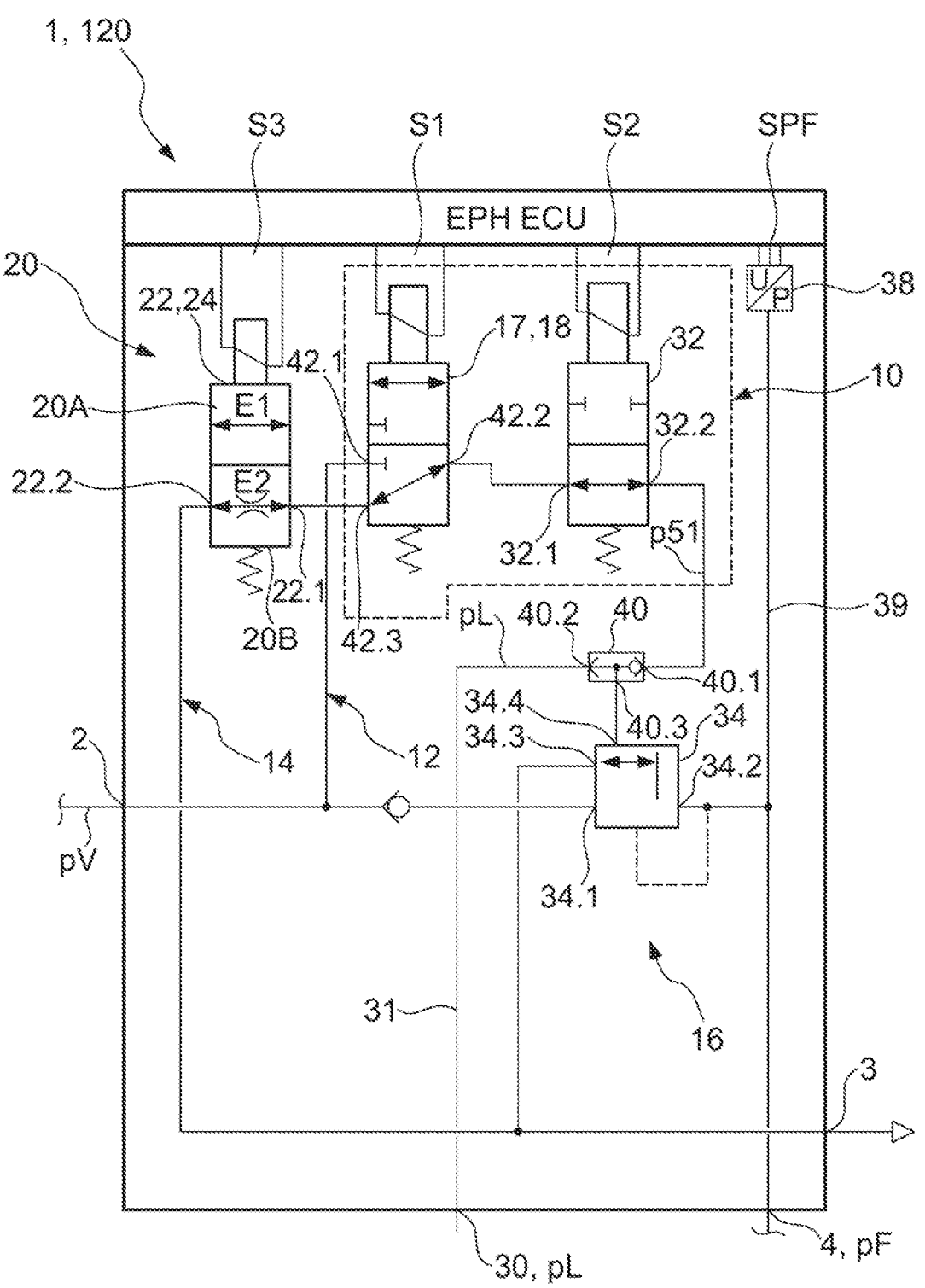
FIG. 4 shows a third embodiment of an electropneumatic holding brake unit.

FIG. 4 shows a third embodiment of the electropneumatic holding brake module 1. Again, identical and similar elements are denoted by the same reference designations, such that reference is made to the above description in its entirety. The third embodiment (FIG. 4) is substantially based on the second embodiment (FIG. 3). Below, in particular, the differences will be highlighted.

The major difference in the third embodiment (FIG. 4) in relation to the second embodiment (FIG. 3) is that the inlet-outlet valve 17, although again configured as a 3/2 directional inlet-outlet valve 18, is in this case configured as a monostable 3/2 directional inlet-outlet valve 42. It has a first 3/2 directional valve port 42.1, which is connected to the supply port 2 and receives supply pressure pV. A second 3/2 directional valve port 42.2 is, analogously to the second bistable valve port 19.2, connected to the pressure-maintaining valve 32, more specifically to the first pressure-maintaining valve port 32.1. A third 3/2 directional valve port 42.3 is, analogously to the third bistable valve port 19.3, connected to the pilot control ventilation path 14, more specifically to the monostable throttle valve unit 20, and in the specific embodiment according to FIG. 4 to the first throttle valve port 22.1. A monostable 3/2 directional inlet-outlet valve 42 has the advantage that it can be smaller and also less expensive than a bistable valve.

A fourth embodiment (FIG. 5) is substantially based on the second embodiment (FIG. 3), such that, again, identical and similar elements are denoted by the same reference designations. Again, reference is made to the above description in its entirety, and the differences are highlighted below.

The main difference in the fourth embodiment (FIG. 5) is that a release valve 50 is provided, which is connected pneumatically between the release port 30 and the main valve unit 16. More specifically, the release valve 50 is even connected between the release port and the pilot control unit 10 in order to thus output the release pressure pL via the pilot control unit 10 to the main valve unit 16, in order to thus effect the outputting of a spring brake pressure pF in a manner dependent on a switching position of the release valve 16.

Figure 5:
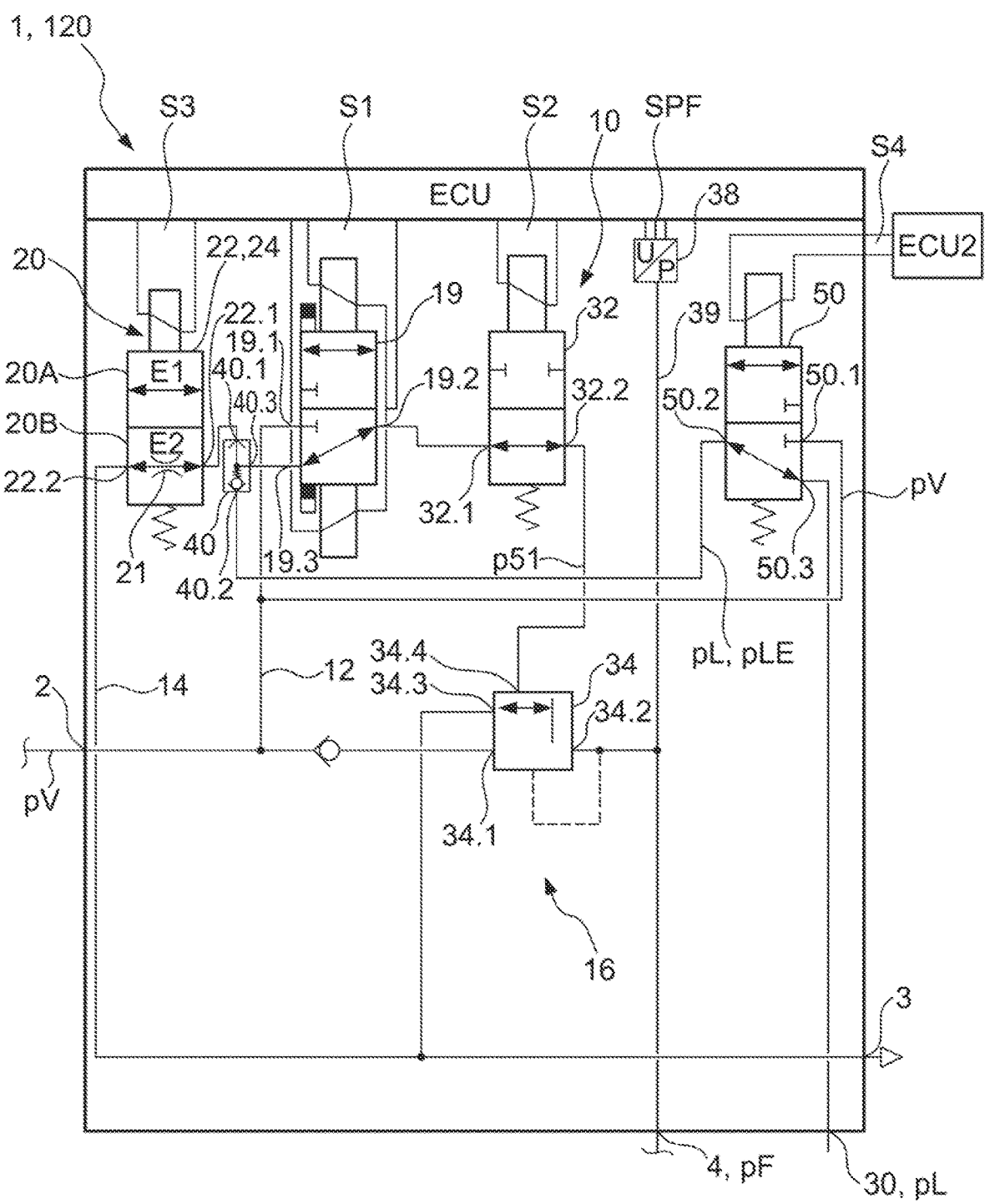
FIG. 5 shows a fourth embodiment of an electropneumatic holding brake unit.

In the specific embodiment shown in FIG. 5, the release valve 50 is configured as a monostable 3/2 directional valve and has a first release valve port 50.1, which is connected to the supply port 2 and receives supply pressure pV, a second release valve port 50.2, which is connected to the pilot control unit 10, and a third release valve port 50.3, which is connected to the release port 30. In the first stable switching position shown in FIG. 5, the second release valve port 50.2 is connected to the third release valve port 50.3, such that the release pressure pL output at the release port 30 can be transmitted from the third release valve port to the second release valve port 50.2 and thus provided to the pilot control unit 10. However, the release valve 50 can also, on the basis of a fourth switching signal S4, be switched in order to connect the first release valve port 50.1 to the second release valve port 50.2 in order to thus output the supply pressure pV to the pilot control unit 10. The fourth switching signal S4 is preferably provided by a second electronic control unit ECU2, which is an external electronic control unit, that is, is not integrated into the electropneumatic holding brake valve unit 1, and is also independent of the electronic control unit ECU. The external electronic control unit ECU2 may for example be the control unit of a central module, of a superordinate module, of a further axle modulator, of a trailer valve or the like.

In the fourth embodiment shown in FIG. 5, the release pressure pL, which is provided to the pilot control unit 10 via the release valve 50, is then input via the first shuttle valve 40. In order to achieve this, in the embodiment shown in FIG. 5, the first shuttle valve port 40.1 is connected to the monostable throttle arrangement, more specifically to the first throttle valve port 22.1. By contrast, the second shuttle valve port 40.2 is connected to the release valve 50, more specifically to the second release valve port 50.2, in order to receive the release pressure pL therefrom. The third shuttle valve port 40.3 is then connected to the pilot control unit 10, specifically, in the embodiment shown in FIG. 5, to the third bistable valve port 19.3, which in the second embodiment shown in FIG. 3 was still directly connected to the throttle arrangement 20. The first shuttle valve 40 is configured such that ventilation of the third bistable valve port 19.3 takes place, as before, via the throttle arrangement 20, but a release pressure pL can be output at the third shuttle valve port 40.3 via the second shuttle valve port 40.2 if the release pressure is higher than the pressure prevailing at the first shuttle valve port 40.1, which is generally the case because the ambient pressure of the vent 3 generally prevails at the first shuttle valve port. This is preferably realized in that the first shuttle valve 40 has a preferred position, as shown in FIG. 5. For this purpose, a spring is provided which exerts load on the first shuttle valve 40 such that, in an unpressurized state, the first and third shuttle valve ports 40.1, 40.3 are connected. This ensures that, when the second shuttle valve port 40.2 is unpressurized, the pilot control unit 10, including the bistable valve 19 and the pressure-maintaining valve 32, is ventilated via the throttle arrangement 20, that is, the first shuttle valve port 40.1 and not the second shuttle valve port 40.2.

The provision of the release valve 50 has the further effect that, by switching of the release valve 50 into the second switching position (not shown in FIG. 5), the release pressure pL can be electronically output as an electronically output release pressure pLE. This means that, according to this embodiment, in order to output the release pressure pL to the pilot control unit 10, it is not imperatively necessary for a release pressure pL to be provided at the release port 30; rather, the release valve 50 can also be switched in order to thus pass the supply pressure pV through and provide this as an electronically output release pressure pLE to the pilot control unit 10. In this way, pneumatic piping can be reduced, and the range of application can be increased. It is furthermore possible to improve safety in the event that, on the one hand, no release pressure pL is provided, but on the other hand, the electronic control unit ECU has failed and the spring brake pressure pF can no longer be electronically output via the pilot control unit 10. In this situation, and if the bistable valve 19 is in the first switching position shown in FIG. 5, the electronically output release pressure pLE can be provided via the release valve 50 in order to thus pressurize the spring-type accumulator port 4.

However, the connection configuration of the release valve 50 as shown in the fourth embodiment is not the only possibility. It should be understood that, even in a basic configuration such as that shown in the second embodiment (FIG. 3), the release valve 50 may also be inserted directly in the line that runs from the release port 30 to the second shuttle valve port 40.2.

Figure 6:
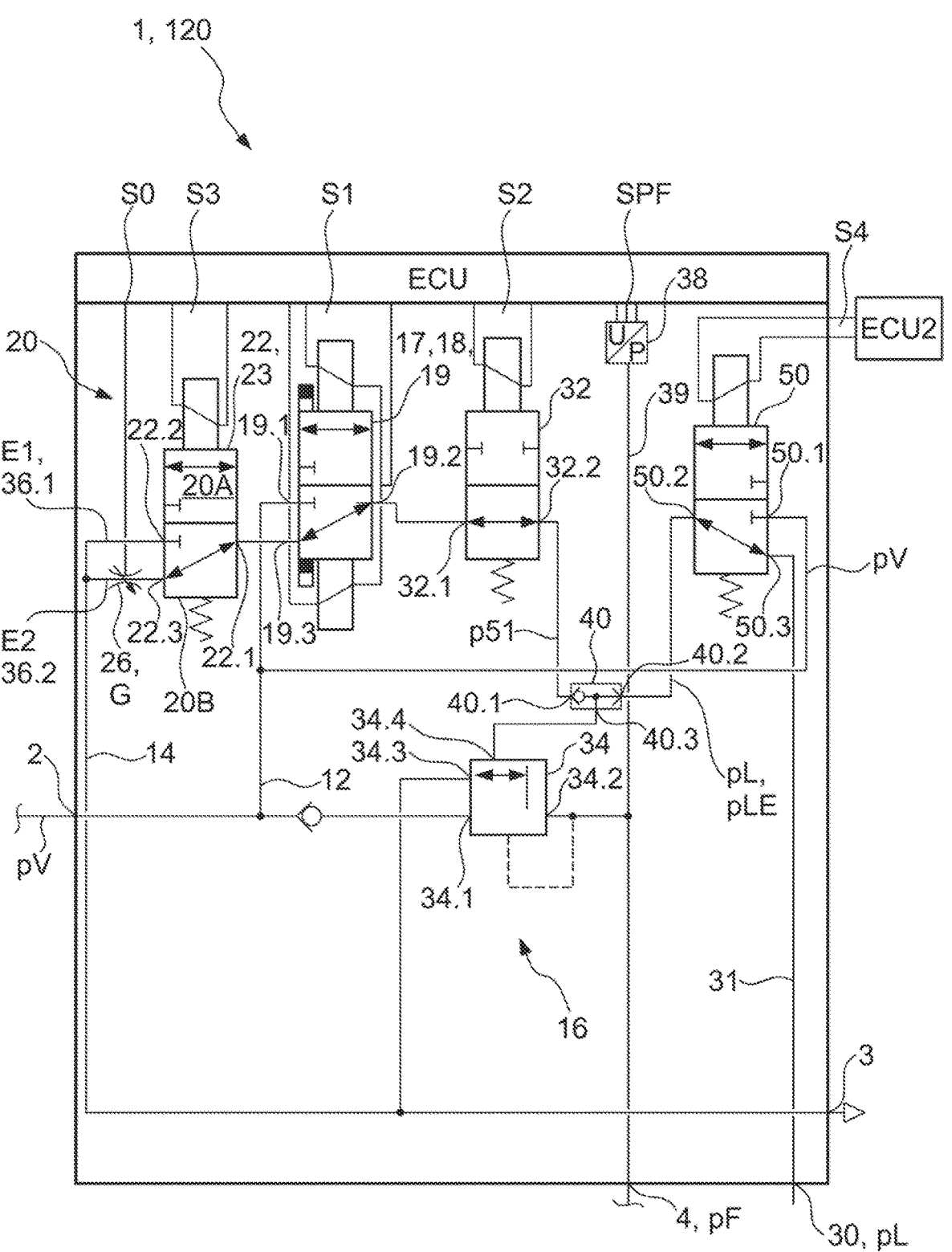
FIG. 6 shows a fifth embodiment of an electropneumatic holding brake unit.

Such a configuration is shown, for example, in the fifth embodiment (FIG. 6). In the fifth embodiment (FIG. 6), identical and similar elements are again denoted by the same reference designations as in the previous embodiments, such that reference is again made to the above description in its entirety. Below, a description will again be given in particular of the differences in relation to the previous embodiments, wherein, in this regard, reference is made primarily to the first embodiment (FIG. 2) and the fourth embodiment (FIG. 5).

In a basic configuration, the layout according to the fifth embodiment (FIG. 6) corresponds to that of the first embodiment (FIG. 2).

Firstly, the release valve 50 is, as mentioned above, incorporated directly into the release pressure line 31 (see FIG. 2) that connects the release port 30 to the main valve unit 16, more specifically to the first shuttle valve 40 in the embodiment shown. For this purpose, the release valve 50 is in turn connected between the release port 30 and the main valve unit 16, but not between the release port 30 and the pilot control unit 10. Rather, the release valve 50 is connected so as to open between the pilot control unit 10 and the main valve unit 16 therein. For this purpose, the first release valve port 50.1 is in turn connected to the supply port 2 in order to receive supply pressure pV. The third release valve port 50.3 is in turn connected to the release port 30, as has also been described with reference to FIG. 5, and receives the release pressure pL. However, the second release valve port 50.2 is not connected to the pilot control ventilation path 14 upstream of the bistable valve 19.1, as shown in FIG. 5, but opens directly into the second shuttle valve port 40.2, as has also been described with reference to the release pressure line 31 in FIG. 2. The release valve 50 is thus actually incorporated into the release pressure line 31. This does not result in a change in the connection configuration of the pilot control unit 10 and/or of the main valve unit 16. Again, the release valve 50 can be switched by a fourth switching signal S4, as has already been described in principle with reference to FIG. 5, in order to thus provide the electronically output release pressure pLE to the main valve unit 16, in order, in the situation that no release pressure pL is output at the release port 30, to nevertheless be able to thus output the spring brake pressure pF.

A further difference in the fifth embodiment (FIG. 6), which is however independent of the difference just described in the connection configuration of the release valve 50, such that the two differences can also be combined separately from one another with one or more of the further embodiments described herein, lies in the configuration of the throttle arrangement 20.

Basically, the throttle arrangement 20 is configured analogously to the first embodiment (FIG. 2), and again includes the 3/2 directional throttle valve 23. The first, second and third throttle valve ports 22.1, 22.2, 22.3 are likewise also connected as has already been described with reference to FIG. 2. One difference however lies in the fact that no throttle 21 is arranged within the valve 22 itself, but in the fifth embodiment shown in FIG. 6 an adjustable throttle 26 is arranged downstream of the third throttle valve port 22.3 in the throttled ventilation path E2, more specifically in the second line piece 36.2 in the embodiment shown. The functioning of the first monostable throttle valve 22 is identical to the functioning of the first monostable throttle valve 22 that was described with reference to FIG. 2. However, the adjustable throttle 26 is adjustable, whereas the throttle 21 is not adjustable. Adjustable means here that a degree of throttling G can be varied, specifically by providing an electronic throttle signal SD, which in this case is also provided by the electronic control unit ECU. It should be understood that the throttle signal SD may however also be provided by other electronic control units, such as in particular the external electronic control unit ECU2, a central module, a superordinate unit, a further axle modulator, or an autonomous driving unit 102, as described with reference to FIG. 1. A degree of throttling G denotes a ratio between a maximum cross section and a presently set reduced cross section. The degree of throttling G may preferably be set in a manner dependent on certain information regarding the vehicle 200, such as in particular data ST provided by the electronically controllable pneumatic brake system 206, in a manner dependent on a vehicle type SF, a loading condition SZ, an axle load SA, a vehicle mass SM or a brake distribution SBV. In the embodiment shown here, the corresponding signals are provided by the autonomous driving unit, in particular via the vehicle bus 212 (cf. FIG. 1).

Whereas the embodiments 1 to 5 (cf. FIGS. 2 to 6) each show an electropneumatic holding brake unit 1 which is configured to be integrated as an electropneumatic holding brake module 120, the embodiments 6 to 9 each show electropneumatic holding brake units 1 which include an electropneumatic holding brake module 120, wherein, however, the throttle arrangement 20 is not integrated into the electropneumatic holding brake module 120 but is arranged externally with respect thereto. The embodiments 6 to 9 are therefore also particularly suitable for equipping existing holding brake modules, such as are already known and installed commercially, with further elements, namely in particular the throttle arrangement 20, in order to thus obtain an electropneumatic holding brake unit 1 according to the disclosure described herein.

In all four embodiments 6, 7, 8 and 9 (FIGS. 7 to 10) still to be described, the electropneumatic holding brake module 120 is of the same configuration, specifically in principle as already described with reference to the first embodiment (FIG. 2), wherein the throttle arrangement 20 is however arranged externally with respect to the holding brake module 120. The electropneumatic holding brake module 120 as shown in FIGS. 7 to 10 is known in principle. It will therefore also not be described in detail; rather, with regard to its functioning, reference is made to the description above.

Since the throttle arrangement 20 is arranged externally with respect to the electropneumatic holding brake module 120, it is also not incorporated into the pilot control ventilation path 14. Rather, in the embodiments 6 to 9 (FIGS. 7 to 10), the release port 30 is also used to ventilate the main valve unit 16 in the event that the described second fault F2 occurs. For this purpose, the throttle arrangement 20 is connected to the release port 30. It should be understood that, in the embodiments 6 to 9 (FIGS. 7 to 10), too, the throttle arrangement 20 may be integrated into the electropneumatic holding brake module 120, even though, in FIGS. 7 to 10, it is arranged externally with respect thereto and is arranged downstream of the release port 30 in relation to a ventilation direction.

In this way, the throttle arrangement 20 can perform a dual function and be used not only for the ventilation of the spring-type accumulator port 4 but also for pressurization, and can thus also perform the function of a release valve 50, as described above.

Figure 7:
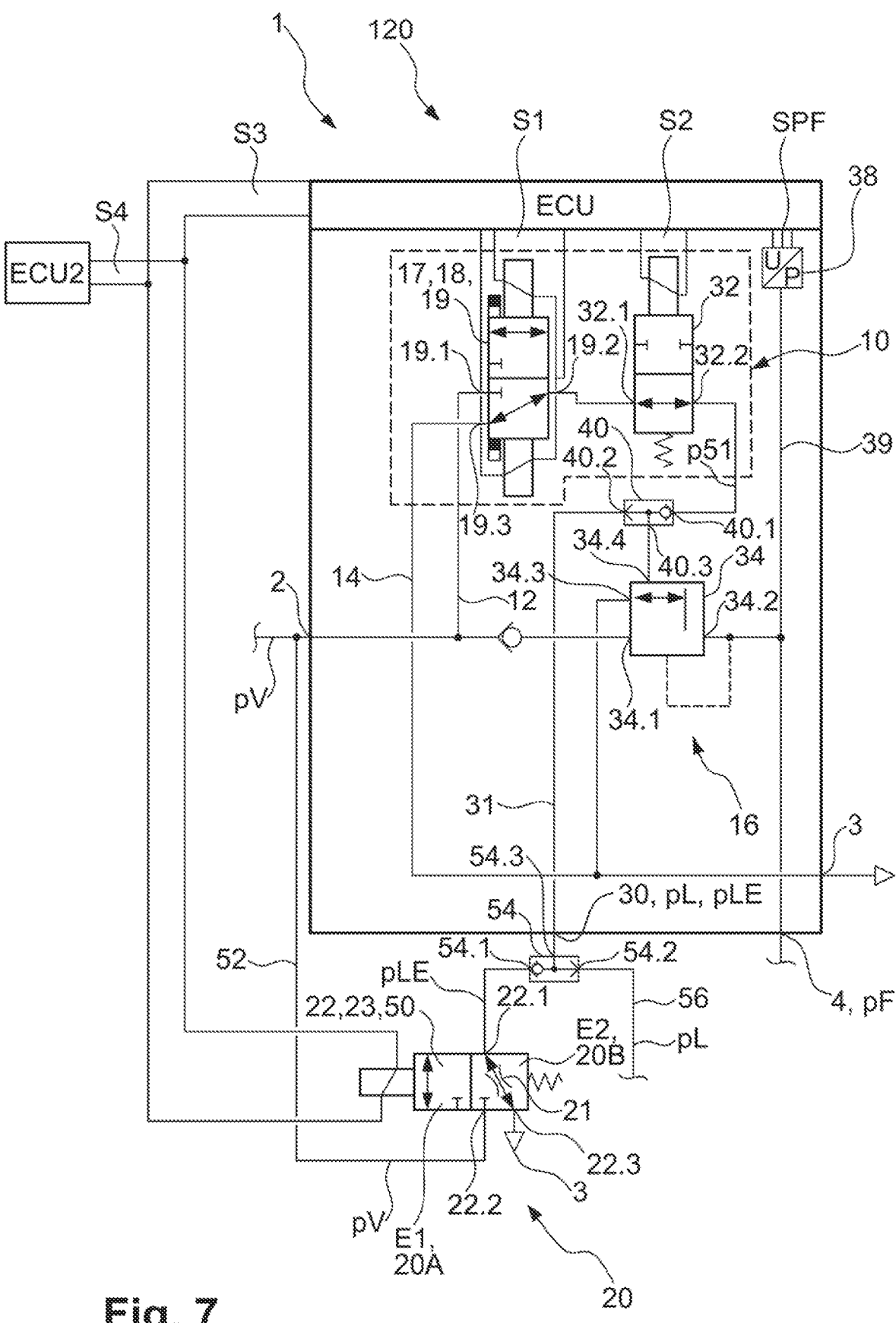
FIG. 7 shows a sixth embodiment of an electropneumatic parking brake unit.

According to the sixth embodiment (FIG. 7), the throttle arrangement 20 again has a first monostable throttle valve 22, which as in the first embodiment (FIG. 2) is configured as a 3/2 directional throttle valve 23, with a throttle 21 that is formed in the 3/2 directional throttle valve 23 itself. The third throttle valve port 22.3 is in turn connected to a vent 3, as has already been described above with reference to FIG. 2. However, both the first throttle port 22.1 and the second throttle port 22.2 are connected differently. The second throttle port 22.2 is connected in this case to a supply line 52, which branches off upstream of the supply port 2 and thus supplies the second throttle valve port 22.2 with supply pressure pV. The branching off upstream of the supply port 2 is necessary only if the throttle arrangement 20 is not integrated into the holding brake unit 120, as illustrated in FIG. 7. If the throttle arrangement 20 is integrated into the holding brake module 120, the second throttle valve port 22.2 may also be connected directly to the supply port 2. However, it should be understood that the connection of the second throttle valve port 22.2 to the supply port is also merely optional, and that the second throttle valve port could likewise also be connected to the vent 3. The advantage of the connection of the second throttle valve port 22.2 to the supply line 52 or generally to the supply of supply pressure pV is that the throttle arrangement 20 can thus also be used to pressurize the release port 30 in order to output the electronically output release pressure pLE.

For this purpose, the first throttle valve port 22.1 is connected to the release port 30. For control purposes, the first monostable throttle valve 22 is connected to the electronic control unit ECU and receives a third switching signal S3 therefrom, as already described with reference to FIGS. 2 to 6. Additionally, the first monostable throttle valve 22 is also connected to the external control unit ECU2 in order to receive the fourth switching signal S4 therefrom, since—as described—the first monostable throttle valve 22 is also used to pressurize the release port 3 in order to thereby provide the electronically output release pressure pLE.

In a first, deenergized switching position, the first monostable throttle valve 22 is switched, according to FIG. 7, such that the first throttle valve port 22.1 is connected to the third throttle valve port 22.3, wherein the throttle 21 is connected between these ports, as has already been described in principle with reference to FIG. 2. By contrast, in the second switching position (not shown in FIG. 7), in which the first throttle valve port 22.1 is connected to the second throttle valve port 22.2, supply pressure pV is provided at the release port 30 via the first throttle valve port 22.1. This pressure provided there is then referred to as electronically output release pressure pLE, and is provided from the release port 30 via the release pressure line 31 and the first shuttle valve 40 to the main valve unit 16, as already described above, in order to thus effect the outputting of the spring brake pressure pF.

In order to also implement a manual provision of a release pressure pL or an anti-compounding function or to divert and provide the release pressure pL from another axle VA, HA of the vehicle 200, such as the front or rear axle VA, HA, or in order to allow the release pressure pL to be output, as already described above, by a further module, in particular the central module 100, a second shuttle valve 54 is connected between the first throttle valve port 22.1 and the release port 30. The second shuttle valve 54 has a fourth shuttle valve port 54.1, which is connected to the first throttle valve port 22.1, and a fifth shuttle valve port 54.2, which is connected to an external release pressure line 56, via which the release pressure pL can be input by an external unit or manually. The second shuttle valve 54 then outputs the respectively higher of the pressures prevailing at the fourth and fifth shuttle valve ports 54.1, 54.2 at a sixth shuttle valve port 54.3, which is connected to the release port 30.

In order to now implement ventilation via the throttled ventilation path E2 in the event that a second fault occurs that makes an actuation by the electronic control unit ECU impossible, it must firstly be understood that, in general, the first control pressure pS1 prevailing at the first shuttle valve port 40.1 is higher than the pressure prevailing at the second shuttle valve port 40.2. In the redundancy situation, if the external electronic control unit ECU2 has already failed, it is also the case that a fourth switching signal S4 is no longer provided. That is, the first monostable throttle valve 22 is in the first switching position shown in FIG. 7. If the pressure-maintaining valve 32 is now also deenergized owing to the second fault F2, the absence of the second switching signal S2 makes it necessary for the first shuttle valve 40 to be configured such that the pressure prevailing at the relay valve control port 34.4 can be ventilated via the second shuttle valve port 40.2, in order to thus implement the ventilation path from the relay valve control port 34.4 via the release port 30, the second shuttle valve 54 and the throttle arrangement 20 via the throttled ventilation path E2. This can be achieved on the one hand by the first shuttle valve 40 being preloaded into this position, and on the other hand also by a release pressure pL being briefly provided from another axle VA, HA via the external release line 56 in order to move the first shuttle valve 40 into the corresponding switching position.

The seventh embodiment (FIG. 8) is in turn substantially based on the sixth embodiment (FIG. 7), such that identical and similar elements are denoted by the same reference designations and reference is made to the above description in its entirety. Again, in particular, the differences in relation to the sixth embodiment (FIG. 7) will be highlighted below.

In the seventh embodiment (FIG. 8), too, the throttle arrangement 20 is arranged externally with respect to the electropneumatic holding brake module 120, and in particular downstream of the release port 30 in a ventilation direction. By contrast to the sixth embodiment (FIG. 7), the throttle arrangement 20 also includes a second monostable throttle valve 28 in addition to the first monostable throttle valve 22. The first monostable throttle valve 22, which in turn is configured as a 3/2 directional throttle valve 23 and also performs the function of a release valve 50, is connected in a similar manner to that in the sixth embodiment (FIG. 7). The third throttle valve port 22.3 is in turn connected to a vent 3, and the second throttle valve port 22.2 to the supply line 52 for the purposes of receiving supply pressure pV. The first throttle valve port 22.1 leads to the release port 30, again with the interposition of the second shuttle valve 54. By contrast to the sixth embodiment (FIG. 7), however, the second monostable throttle valve 28 is connected between the first throttle valve port 22.1 and the second shuttle valve 54. The second monostable throttle valve 28 has a fourth throttle valve port 28.1, a fifth throttle valve port 28.2 and a sixth throttle valve port 28.3. The second monostable throttle valve 28 is structurally identical to the first monostable throttle valve 22, but this is not necessary, and it should be understood that these may also, in part, be of different configuration. The fourth throttle valve port 28.1 is connected here to the second shuttle valve 54, though may also be connected directly to the release port 30, as has likewise already been described with reference to FIG. 7. The fifth throttle valve port 28.2 is connected to the supply line 52 and, like the second throttle valve port 22.2, receives supply pressure pV. The sixth throttle valve port 28.3 is then connected here to the first monostable throttle valve 22, more specifically to the first throttle valve port 22.1. In relation to the vent 3, the first and second monostable throttle valves 22, 28 are thus pneumatically connected in series.

The first monostable throttle valve 22 is controlled here via the fourth switching signal S4 from the external control unit ECU2. The second monostable throttle valve 28 is controlled by the electronic control unit ECU of the holding brake module 120 by way of the third switching signal S3. The second monostable throttle valve 28 thus has substantially the same function here as the first monostable throttle valve 22 also had in previous embodiments. However, it is not sufficient for the second monostable throttle valve 28 to be deenergized so as to assume the first switching position shown in FIG. 8 in order to ventilate the release port 30 and thus the spring-type accumulator port 4; rather, it is also necessary for the first monostable throttle valve 22 to likewise be deenergized. It is only in this way, when both the first and the second monostable throttle valve 22, 28 are deenergized, that the release port 30 can be connected to the vent 3. In the two other switching positions, neither of which is shown in FIG. 8, the supply pressure pV is passed both through the first and through the second monostable throttle valve 22, 28 and is provided at the release port 30 in order to thus consequently output the spring brake pressure pF.

Connecting the first and second monostable throttle valves 22, 28 can result in two further switching positions. On the one hand, the third switching signal S3 should be provided permanently during operation. In this case, the supply pressure pV is output via the release port 30 and is thus provided as an electronically output release pressure pLE to the main valve unit 16. It can thus be ensured, independently of the switching of the pilot control unit 10, that the spring brake pressure pF is output and the spring brake cylinders 8a, 8b are released. In this way, a first level of redundancy is already incorporated, namely that the spring brake pressure pF is always provided if one out of the pilot control unit 10 and the second monostable throttle valve 28 is functioning. However, if the electronic control unit ECU fails, the third switching signal S3 is also no longer provided. In this case, the second monostable throttle valve 28 returns to the switching position shown in FIG. 8. At the same time, however, the external control unit ECU2, if it is functional, can continue to provide the fourth switching signal S4 and switch the first monostable throttle valve 22 into the second switching position (not shown in FIG. 8), in which the supply pressure pV is then output at the first throttle valve port 22.1. This is then output (in throttled fashion) at the release port 30 via the sixth throttle valve port 28.3 and the fourth throttle valve port 28.1, such that, in turn, spring brake pressure pF can be output.

Here, both the first and the second monostable throttle valve 22, 28 have integrated throttles 21a, 21b, which together form the degree of throttling G for the throttled ventilation of the spring-type accumulator port 4.

Figure 8:
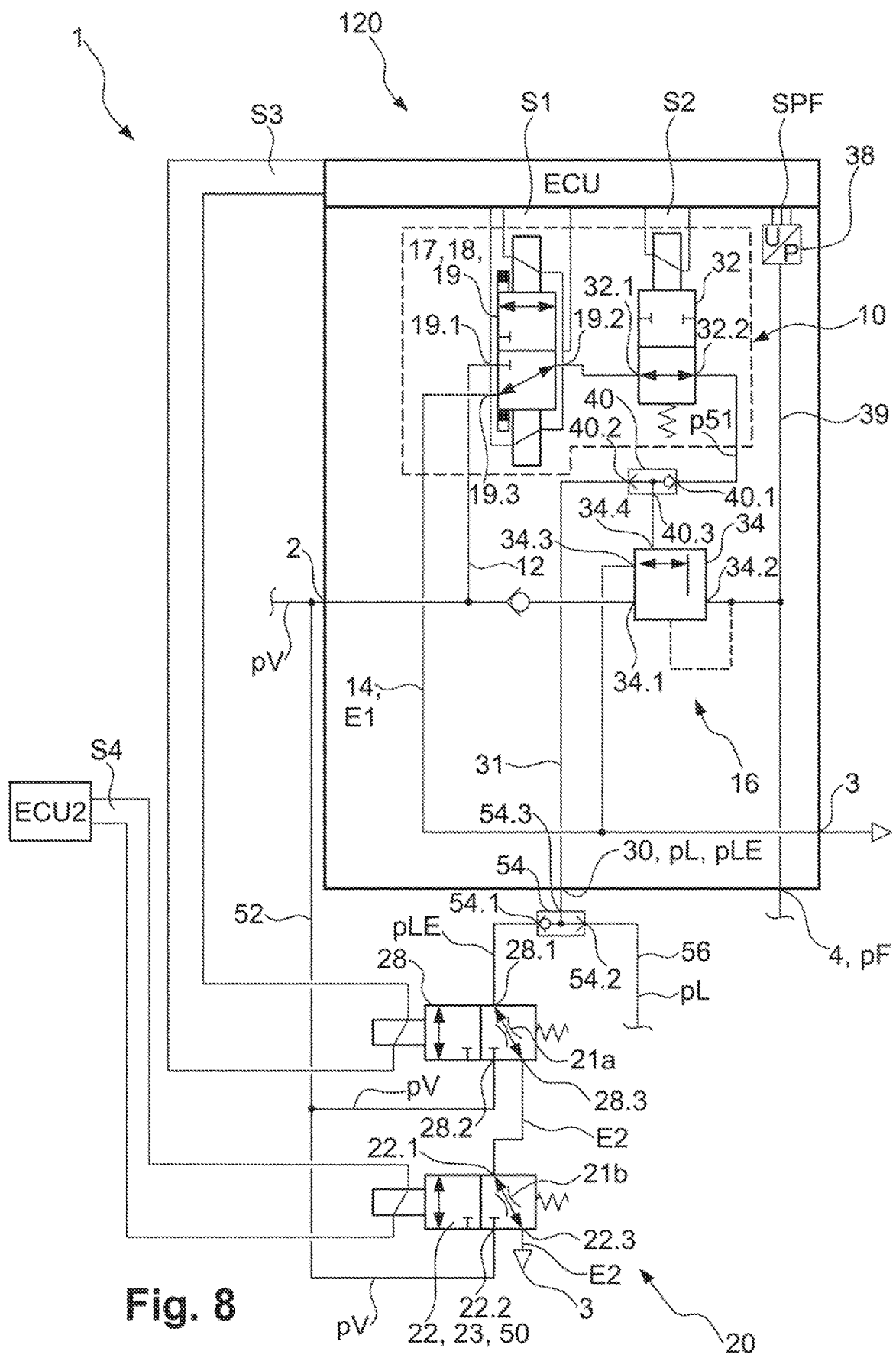
FIG. 8 shows a seventh embodiment of an electropneumatic holding brake unit.

The eighth embodiment (FIG. 9) in turn includes the throttle arrangement 20 and a first and a second monostable throttle valve 22, 28, which are however connected somewhat differently than in the seventh embodiment (FIG. 8). Again, identical and similar elements are denoted by the same reference designations below, and reference is therefore made to the above description in its entirety. The following description of the eighth embodiment highlights in particular the differences in relation to the seventh embodiment (FIG. 8).

A first difference in the eighth embodiment (FIG. 9) in relation to the seventh embodiment (FIG. 8) is that the second throttle valve 28 itself has no throttle 21a, as was still the case in the seventh embodiment. A throttle 21 is formed here in the first throttle valve 22, which is of identical configuration to the monostable throttle valve 22 of FIG. 8. Also, in the eighth embodiment (FIG. 9), the third throttle valve port 22.3 is connected to the vent 3, the second throttle valve port 22.2 is connected to the supply line 52 in order to receive supply pressure pV, and the first throttle valve port 22.1 is connected to the second monostable throttle valve 28, in this case more specifically to the sixth throttle valve port 28.3. By contrast to the seventh embodiment (FIG. 8), however, the fifth throttle valve port 28.2 is connected not to the supply line 52 but to a vent 3. This means that, when the second monostable throttle valve 28 is switched from the first switching position (shown in FIG. 9) into the second switching position (not shown in FIG. 9), supply pressure pV is not provided via the second monostable throttle valve 28 to the second shuttle valve 54, as was the case in the seventh embodiment (FIG. 8), but rather the second shuttle valve 54 is ventilated. Since the second monostable throttle valve 28 does not include a throttle, an unthrottled ventilation of the release port 30 and thus also an unthrottled ventilation of the spring-type accumulator port 4 via the release port 30 can be achieved in this way. However, in the seventh embodiment (FIG. 8), unthrottled ventilation is possible only via the vent 3, which is arranged on the electropneumatic holding brake module 120, that is, via the pilot control ventilation path 14. In the seventh embodiment (FIG. 8), the throttle arrangement 20 does not allow unthrottled ventilation.

Figure 9:
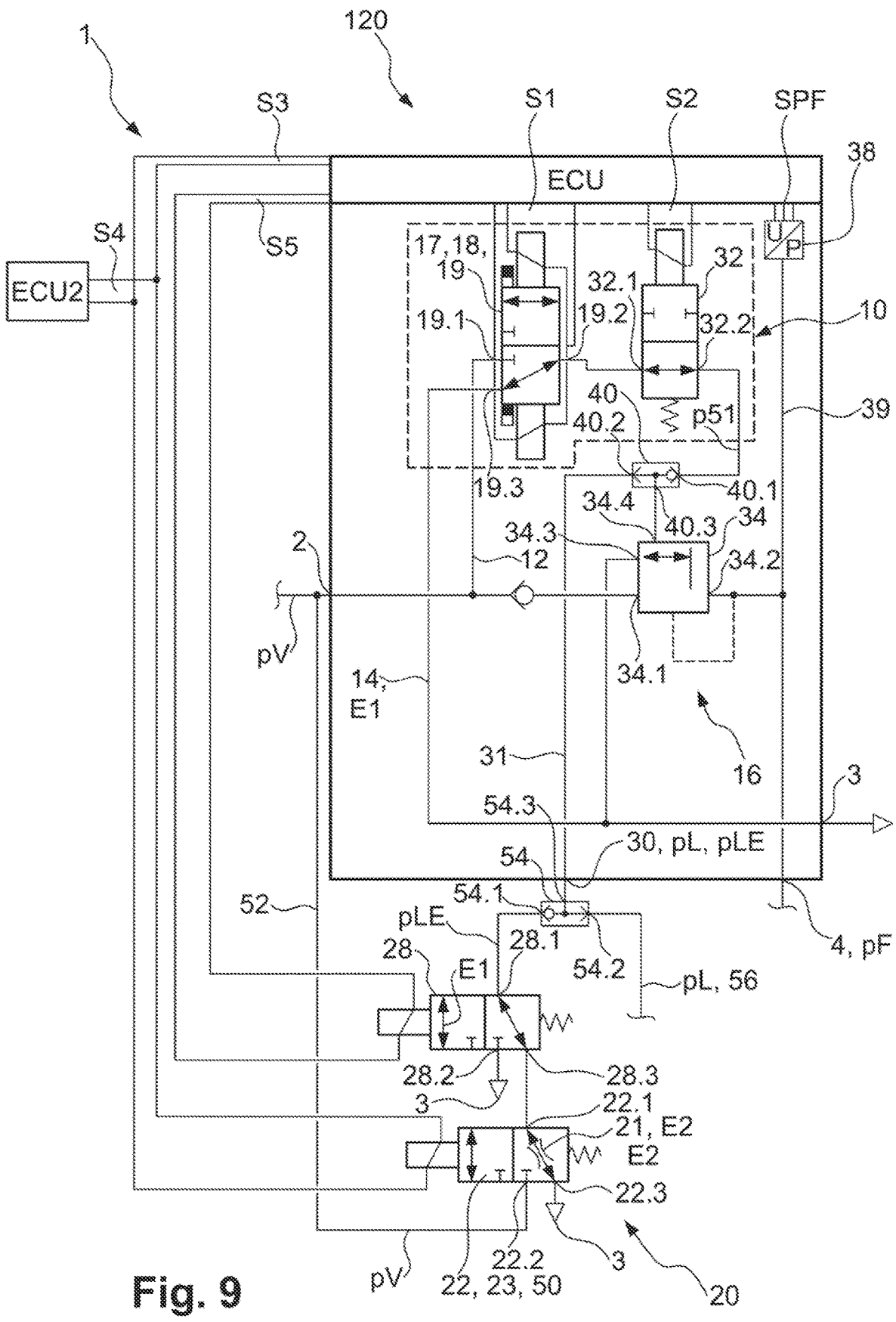
FIG. 9 shows an eighth embodiment of an electropneumatic holding brake unit; and, FIG. 10 shows a ninth embodiment of an electropneumatic holding brake unit.
Figure 10:
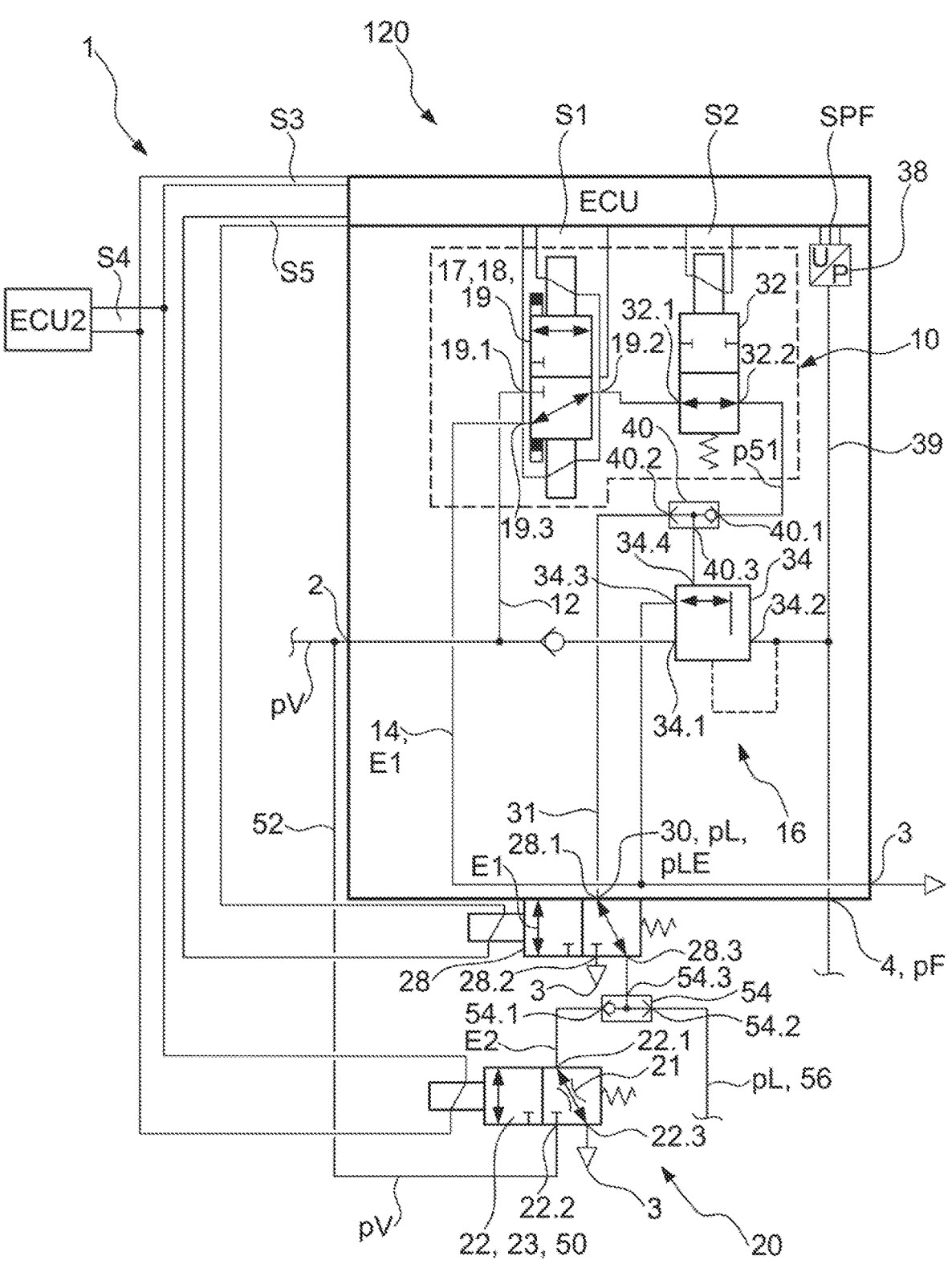

A further difference lies in the fact that the first monostable throttle valve 22 is connected both to the electronic control unit ECU of the holding brake module 120 and to the external control unit ECU2. In the eighth embodiment shown in FIG. 9, the first monostable throttle valve 22 serves not only as a throttle valve 22 but also as a release valve 50, and can therefore be controlled by the external control unit ECU2. When the first monostable throttle valve 22 is switched to the second switching position (not shown in FIG. 9), the second throttle valve port 22.2 is connected to the first throttle valve port 22.1, and the supply pressure pV is passed through the first monostable throttle valve 22. In this state, the second monostable throttle valve 28 should be deenergized and situated in the first switching position shown in FIG. 9, such that the supply pressure pV can also be passed through this in order to be provided as an electronically output release pressure pLE to the fourth shuttle valve port 54.1, in order to then be output via this to the release port 30 and ultimately to the relay valve control port 34.4 in order to effect the outputting of the spring brake pressure pF. The second monostable throttle valve 28 is then switched into the second switching position (not shown in FIG. 9) if the release port 30 is to be ventilated in unthrottled fashion. For this purpose, the second monostable throttle valve 28 in the eighth embodiment shown in FIG. 9 is controllable by the electronic control unit ECU, specifically by way of a fifth switching signal S5.

In the ninth embodiment (FIG. 10), identical and similar elements are again denoted by the same reference designations, such that reference is made to the above description in its entirety. In the ninth embodiment, too, a description will be given in particular of the differences in relation to the previous embodiment. The ninth embodiment is substantially based on the eighth embodiment (FIG. 9), such that the differences in relation thereto will be described.

A first difference in the ninth embodiment in relation to the eighth embodiment (FIG. 9) is that, from a pneumatic aspect, the positions of the second throttle valve 28 and of the second shuttle valve 54 have been interchanged. Specifically, this means that the release port 30 is connected not to the sixth shuttle valve port 54.3 but to the fourth throttle valve port 28.1. The sixth shuttle valve port 54.3 is then in turn connected to the sixth throttle valve port 28.3. The fifth shuttle valve port 54.2 is in turn connected to a vent 3, as has already been described in the eighth embodiment (FIG. 9). The result of this interchange is that unthrottled ventilation via the second throttle valve 28 does not necessarily have to take place also via the second shuttle valve 54, as is the case in the eighth embodiment (FIG. 9). The throttled ventilation via the throttled ventilation path E2 and the use of the first throttle valve 22 as a release valve 50 function in the same way as in the eighth embodiment (FIG. 9).

However, there is a difference if the release pressure pL is manually input via the external release pressure line 56. In order to be able to output this to the release port 30, it is necessary for the second throttle valve 28 to be deenergized and situated in the first switching position shown in FIG. 10.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Holding brake valve arrangement
2 Supply port
3 Vent
4 Spring-type accumulator port
8a, 8b Spring brake cylinder
10 Pilot control unit
12 Pilot control aeration path
14 Pilot control ventilation path
16 Main valve unit
17 Inlet-outlet valve
18 3/2 directional inlet-outlet valve
19 Bistable valve
19.1 First bistable valve port
19.2 Second bistable valve port
19.3 Third bistable valve port
20 Throttle arrangement
21 First throttle
22 First monostable throttle valve
22.1 First throttle valve port
22.2 Second throttle valve port
22.3 Third throttle valve port
23 3/2 directional throttle valve
24 2/2 directional throttle valve
26 Adjustable throttle
28 Second monostable throttle valve
30 Release port
31 Release pressure line
32 Pressure-maintaining valve
32.1 First pressure-maintaining valve port
32.2 Second pressure-maintaining valve port
34 Relay valve
34.1 Relay valve supply port
34.2 Relay valve working port
34.3 Relay valve ventilation port
34.4 Relay valve control port
36.1 First line piece
36.2 Second line piece
36.3 Connection node
38 Pressure sensor
39 Pressure measurement line
40 First shuttle valve
40.1 First shuttle valve port
40.2 Second shuttle valve port
40.3 Third shuttle valve port
42 Monostable 3/2 directional inlet-outlet valve
42.1 First 3/2 directional valve port
42.2 Second 3/2 directional valve port
42.3 Third 3/2 directional valve port
50 Release valve
50.1 First release valve port
50.2 Second release valve port 50.3 Third release valve port
52 Supply line
54 Second shuttle valve
54.1 Fourth shuttle valve port
54.2 Fifth shuttle valve port
54.3 Sixth shuttle valve port
56 External release pressure line
100 Central module
102 Autonomous driving unit
104 Front axle modulator
106a, 106b Front axle brake actuators
108a, 108b Rear axle brake actuators
110 Brake signal transmitter
112 First electrical brake signal transmitter line
114 Second electrical brake signal transmitter line
200 Vehicle
202 Utility vehicle
206 Electronically controllable pneumatic brake system
208 Service brake system
210 Redundancy system
212 Vehicle bus
214 Front axle brake circuit
216 Rear axle brake circuit
218 Parking brake circuit
120 Electropneumatic holding brake module
122 First energy source
124 Second energy source
126 Front axle redundancy pressure line
128 Front axle shuttle valve
E1 Unthrottled ventilation path
E2 Throttled ventilation path
ECU Electronic control unit
ECU2 External electronic control unit
F1 First fault
F2 Second fault
pBST Pneumatic brake signal transmitter pressure
pBVA Front axle brake pressure
pBHA Rear axle brake pressure
pF Spring brake pressure
pL Release pressure
pLE Electronically output release pressure
pRVA Front axle redundancy pressure
pS1 First control pressure
pV Supply pressure
HA Rear axle
S1 First switching signal
S2 Second switching signal
S3 Third switching signal
S4 Fourth switching signal
S5 Fifth switching signal
SBST Brake signal transmitter signal
SBVA Front axle brake signal
SD Electronic throttle signal
SPF Spring brake pressure signal
VA Front axle
XBR Braking demand signal

What is claimed is:

1. A method for safe emergency stopping of a vehicle including a utility vehicle, the vehicle having an electronically controllable pneumatic brake system with spring brake cylinders on at least one axle (HA); the electronically controllable pneumatic brake system including a service brake system; and, at least one first redundancy system configured to brake the vehicle in response to a first fault (F1) in the service brake system; and, said electronically controllable pneumatic brake system further including an unthrottled ventilation path (E1) and a further ventilation path (E2) for venting the spring brake cylinders, the further ventilation path (E2) being throttled relative to the unthrottled ventilation path (E1), the method comprising the steps:

determining a second fault (F2) in the at least one first redundancy system; and, in response to the determination of the second fault (F2), automatically throttling ventilation of at least one of the spring brake cylinders via the throttled ventilation path (E2) to effect a slow, safe stopping of the vehicle.

2. The method of claim 1, wherein the automatically throttled ventilation comprises deenergization (S3) of at least one monostable valve.

3. The method of claim 1, wherein the service brake system of the electronically controllable pneumatic brake system is controlled by a central module and the at least one first redundancy system of the electronically controllable pneumatic brake system is controlled by a holding brake unit that is pneumatically connected to the spring brake cylinders.

4. The method of claim 3, wherein:

in an operating situation in which no fault is present, the holding brake unit pressurizes the spring brake cylinders to effect releasing thereof;

in a first redundancy situation, when the first fault (F1) is present in the service brake system, the holding brake unit performs the control of the electronically controllable pneumatic brake system; and, in a multiple fault situation, when the first fault (F1) is present in the service brake system and the second fault (F2) is present in the at least one first redundancy system, the spring brake cylinders are ventilated via automatic throttling.

5. The method of claim 3, wherein, when the electronically controllable pneumatic brake system has a second redundancy system, the holding brake unit ventilates the spring brake cylinders via automatic throttling only if, in addition to the first and second faults (F1, F2), a third fault also occurs in the second redundancy system.

6. The method of claim 3, wherein, if initially the second fault (F2) in the first redundancy system occurs, and as a result the holding brake unit deenergizes one or more monostable valves such that the spring brake cylinders are ventilated, a further unit or the central module initiates an aeration of the spring brake cylinders.

7. The method of claim 6, wherein the aeration of the spring brake cylinders is implemented by the further unit or the central module via a release port on the holding brake unit.

8. The method of claim 7, wherein said automatically throttling ventilation is effected via the release port.

9. The method of claim 1, comprising the further step of:

setting a degree of throttling (G) of the throttled ventilation path (E2) while the electronically controllable pneumatic brake system is controlled by the service brake system.

10. The method of claim 9, wherein the setting of the degree of throttling (G) is performed via at least one of the following:

a) in a manner dependent on data (ST) provided via a vehicle bus;

b) from the electronically controllable pneumatic brake system; and, c) in a manner dependent on a vehicle type (SF), a loading condition (SZ), an axle load (SA), a vehicle mass (SM) or a brake distribution (SBV).

11. An electropneumatic holding brake unit for implementing a method for safe emergency stopping of a vehicle including a utility vehicle, the vehicle having an electronically controllable pneumatic brake system with spring brake cylinders on at least one axle (HA); the electronically controllable pneumatic brake system including a service brake system; and, at least one first redundancy system configured to brake the vehicle in response to a first fault (F1) in the service brake system; and, said electronically controllable pneumatic brake system further including an unthrottled ventilation path (E1) and a further ventilation path (E2) for venting the spring brake cylinders, the further ventilation path (E2) being throttled relative to the unthrottled ventilation path (E1), the method including the steps: determining a second fault (F2) in the at least one first redundancy system; and, in response to a determination of the second fault (F2), automatically throttling ventilation of at least one of the spring brake cylinders via the throttled ventilation path (E2) to effect a slow, safe stopping of the vehicle; the electropneumatic holding brake unit being for the automated throttled ventilation of at least one of the spring brake cylinders in a fault situation (F1, F2), the electropneumatic holding brake unit comprising:

a supply port for receiving supply pressure (pV);
a spring-type accumulator port for the connection of at least one of the spring brake cylinders;
a pilot control unit for providing a first control pressure (pS1), which pilot control unit has a pilot control ventilation path, which is connected to the supply port and receives supply pressure (pV), and a pilot control ventilation path, which is connected to a ventilation port;
a main valve unit which receives the first control pressure (pS1) and which is configured to provide a spring brake pressure (pF) at the spring-type accumulator port in a manner dependent on the received first control pressure (pS1); and,
a monostable throttle arrangement, which when energized is held in a first switching position, which allows unthrottled ventilation of the spring-type accumulator port via the unthrottled ventilation path (E1), and when deenergized assumes a second switching position, which allows throttled ventilation of the spring-type accumulator port via the throttled ventilation path (E2).

12. The electropneumatic holding brake unit of claim 11, wherein the throttle arrangement is arranged in the pilot control ventilation path.

13. The electropneumatic holding brake unit of claim 11, wherein the throttle arrangement has a first monostable throttle valve which is open in the first switching position of the throttle arrangement and which is open with a throttling action in the second switching position of the throttle arrangement.

14. The electropneumatic holding brake unit of claim 13, wherein the first monostable throttle valve is configured as a 2/2 directional throttle valve or as a 3/2 directional throttle valve.

15. The electropneumatic holding brake unit of claim 13, further comprising an electronically switchable release valve for electronically outputting an electronically output release pressure (pLE) at the main valve unit; and, the first monostable throttle valve and the release valve being integrated into a combination valve.

16. The electropneumatic holding brake unit of claim 13, wherein the throttle arrangement has a second monostable throttle valve which interacts with the first monostable throttle valve for effecting automatic throttled ventilation of the spring-type accumulator port.

17. The electropneumatic holding brake unit of claim 16, wherein a throttled ventilation of the spring-type accumulator port via the throttle arrangement is possible only when the first monostable throttle valve and the second monostable throttle valve are deenergized.

18. The electropneumatic holding brake unit of claim 16, wherein the second monostable throttle valve is controllable by the electronic control unit (ECU).

19. The electropneumatic holding brake unit of claim 11, wherein the monostable throttle arrangement has an adjustable throttle that can be adjusted by an electronic throttle signal (SD).

20. The electropneumatic holding brake unit of claim 11, further comprising a release port for the input of a release pressure (pL); the release port being connected to the main valve unit; and, the main valve unit being configured to provide the spring brake pressure (pF) at the spring-type accumulator port in a manner dependent on the received release pressure (pL).

21. The electropneumatic holding brake unit of claim 20, wherein the throttle arrangement is connected to the release port to effect throttled ventilation of the spring-type accumulator port.

22. The electropneumatic holding brake unit of claim 20, wherein a first shuttle valve is connected between the release port and the main valve unit.

23. The electropneumatic holding brake unit of claim 11, comprising an electronic control unit (ECU) for providing switching signals (S1, S2, S3) at least for the pilot control unit and the throttle arrangement.

24. The electropneumatic holding brake unit of claim 23, further comprising an electronically switchable release valve for electronically outputting an electronically output release pressure (pLE) at the main valve unit, wherein the release valve is controlled by an external electronic control unit (ECU2) that is independent of the electronic control unit (ECU).

25. The electropneumatic holding brake unit of claim 11, wherein the pilot control unit, the main valve unit and an electronic control unit (ECU) are jointly integrated into a holding brake module.

26. An electronically controllable pneumatic brake system comprising:

spring brake cylinders on at least one axle (HA) of a vehicle, including a utility vehicle, wherein the electronically controllable pneumatic brake system has a service brake system and at least one first redundancy system, wherein, in the event of a first fault (F1) in the service brake system, the vehicle is braked by the redundancy system, and an electropneumatic holding brake unit including:
a supply port for receiving supply pressure (pV);
a spring-type accumulator port for the connection of at least one spring brake cylinder;
a pilot control unit for providing a first control pressure (pS1), which pilot control unit has a pilot control ventilation path, which is connected to the supply port and receives supply pressure (pV), and a pilot control ventilation path, which is connected to a ventilation port;
a main valve unit which receives the first control pressure (pS1) and which is configured to provide a spring brake pressure (pF) at the spring-type accumulator port in a manner dependent on the received first control pressure (pS1); and, a monostable throttle arrangement, which when energized is held in a first switching position, which allows unthrottled ventilation of the spring-type accumulator port via an unthrottled ventilation path (E1), and when deenergized assumes a second switching position, which allows throttled ventilation of the spring-type accumulator port via a throttled ventilation path (E2).

27. The electronically controllable pneumatic brake system of claim 26, wherein a release port is connected to at least one of the following: a front axle brake circuit and a rear axle brake circuit.

28. A vehicle, including a utility vehicle, having an electronically controllable pneumatic brake system as claimed in claim 26.

29. A method for safe emergency stopping of a vehicle including a utility vehicle, the vehicle having an electronically controllable pneumatic brake system with spring brake cylinders on at least one axle (HA); the electronically controllable pneumatic brake system including a service brake system; and, at least one first redundancy system configured to brake the vehicle in response to a first fault (F1) in the service brake system; and, said electronically controllable pneumatic brake system further including an unthrottled ventilation path (E1) and a further ventilation path (E2) for venting the spring brake cylinders, the further ventilation path (E2) being throttled relative to the unthrottled ventilation path (E1), the method comprising the steps:

determining a second fault (F2) in the at least one first redundancy system; and,
  in response to the determination of the second fault (F2), automatically throttling ventilation of at least one of the spring brake cylinders via the throttled ventilation path (E2) to effect a slow, safe stopping of the vehicle,
  wherein the service brake system of the electronically controllable pneumatic brake system is controlled by a central module and the at least one first redundancy system of the electronically controllable pneumatic brake system is controlled by a holding brake unit that is pneumatically connected to the spring brake cylinders,
  wherein, if initially the second fault (F2) in the first redundancy system occurs, and as a result the holding brake unit deenergizes one or more monostable valves such that the spring brake cylinders are ventilated, a further unit or the central module initiates an aeration of the spring brake cylinders, and
  wherein the aeration of the spring brake cylinders is implemented by the further unit or the central module via a release port on the holding brake unit.

30. A method for safe emergency stopping of a vehicle including a utility vehicle, the vehicle having an electronically controllable pneumatic brake system with spring brake cylinders on at least one axle (HA); the electronically controllable pneumatic brake system including a service brake system; and, at least one first redundancy system configured to brake the vehicle in response to a first fault (F1) in the service brake system; and, said electronically controllable pneumatic brake system further including an unthrottled ventilation path (E1) and a further ventilation path (E2) for venting the spring brake cylinders, the further ventilation path (E2) being throttled relative to the unthrottled ventilation path (E1), the method comprising the steps:

determining a second fault (F2) in the at least one first redundancy system;
  in response to the determination of the second fault (F2), automatically throttling ventilation of at least one of the spring brake cylinders via the throttled ventilation path (E2) to effect a slow, safe stopping of the vehicle; and
  setting a degree of throttling (G) of the throttled ventilation path (E2) while the electronically controllable pneumatic brake system is controlled by the service brake system.

* * * * *